(12) United States Patent
Yamada et al.

(10) Patent No.: US 8,702,312 B2
(45) Date of Patent: Apr. 22, 2014

(54) ROLLING BEARING

(75) Inventors: Manabu Yamada, Kanagawa (JP);
Masato Miyamoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 276 days.

(21) Appl. No.: 12/994,689

(22) PCT Filed: May 27, 2008

(86) PCT No.: PCT/JP2008/059750
§ 371 (c)(1),
(2), (4) Date: Nov. 24, 2010

(87) PCT Pub. No.: WO2009/144785
PCT Pub. Date: Dec. 3, 2009

(65) Prior Publication Data
US 2011/0069917 A1   Mar. 24, 2011

(51) Int. Cl.
*F16C 33/76* (2006.01)
*F16J 15/34* (2006.01)
*F16J 15/32* (2006.01)

(52) U.S. Cl.
USPC ............ 384/477; 384/486; 277/353; 277/562

(58) Field of Classification Search
USPC ......... 384/477, 478, 480, 481, 484, 485, 486, 384/488; 277/353, 551, 562; 184/6.12; 193/35 MD, 37
See application file for complete search history.

(56) References Cited

U.S. PATENT DOCUMENTS

| 6,287,014 | B1 * | 9/2001 | Salla .............................. 384/546 |
| 6,485,185 | B1 * | 11/2002 | Conway et al. ............... 384/484 |
| 6,637,754 | B1 | 10/2003 | Ohtsuki et al. |
| 7,380,797 | B2 * | 6/2008 | Katogi et al. ................. 277/351 |
| 8,267,591 | B2 * | 9/2012 | Baba et al. .................... 384/486 |
| 2009/0127796 | A1 * | 5/2009 | Kanzaki et al. ............... 277/562 |
| 2009/0206553 | A1 * | 8/2009 | Kanzaki ........................ 277/351 |
| 2009/0322032 | A1 * | 12/2009 | Kanzaki ........................ 277/351 |
| 2010/0232734 | A1 * | 9/2010 | Torii et al. ..................... 384/481 |

FOREIGN PATENT DOCUMENTS

| EP | 1890061 A1 | 2/2008 |
| EP | 1898132 A1 * | 3/2008 |
| JP | 61-81013 U | 5/1986 |
| JP | 2-25774 U | 2/1990 |
| JP | 2804517 B2 | 9/1998 |
| JP | 2001-50288 A | 2/2001 |

(Continued)

OTHER PUBLICATIONS

Office Action dated Aug. 6, 2013 issued by the Japanese Patent Office in counterpart Japanese Patent Application No. 2010-514281.

(Continued)

*Primary Examiner* — Marcus Charles
*Assistant Examiner* — Adam D Rogers
(74) *Attorney, Agent, or Firm* — Sughrue Mion, PLLC

(57) ABSTRACT

A conveyor bearing includes an inner ring fitted on and fixed to a shaft, a plurality of rolling elements arranged rollably on a raceway surface of the inner ring, an outer ring disposed of rotatably relative to the inner ring via the rolling elements, and a seal member to seal in a grease between the outer ring and the inner ring. The seal member has a plurality of seal lips and is mounted on at least one location on the bearing.

7 Claims, 14 Drawing Sheets

(56) References Cited

FOREIGN PATENT DOCUMENTS

| | | |
|---|---|---|
| JP | 2001-289254 A | 10/2001 |
| JP | 2005-308013 A | 11/2005 |
| JP | 2006-312951 A | 11/2006 |
| JP | 2006-342827 A | 12/2006 |
| JP | 2008-25644 A | 2/2008 |
| JP | 2008-82352 A | 4/2008 |
| JP | 2008-208946 A | 9/2008 |
| JP | 2008-267462 A | 11/2008 |
| WO | WO 2006132083 A1 * | 12/2006 |

OTHER PUBLICATIONS

Office Action dated Jun. 20, 2013, issued by The State Intellectual Property Office of the People's Republic of China in corresponding Application No. 200880129521.X.

* cited by examiner

ROLLING BEARING

TECHNICAL FIELD

The present invention relates to bearings suitable for use in industry and, more particularly, to a conveyor bearing for use in an idler roller of a conveyor, in which dustproofness and waterproofness are improved and a configuration is simplified.

BACKGROUND ART

Conventionally, in bearings for conveyor idler rollers (hereinafter, referred to as conveyor bearings), in order to provide dustproofness and waterproofness thereto, bearings are generally used which has a configuration as shown in FIG. 6 in which a labyrinth-shaped seal is combined to an external side of a shield-type deep groove ball bearing or an open-type ball bearing.

As shown in the same figure, a conveyor bearing 5 is made up of an inner ring 6 which is fitted on and fixed to a shaft 1 and an outer ring 7 which is disposed rotatably relative to the inner ring 6 via a plurality of balls 8. The outer ring 7 is fixedly fitted in a bearing member 3 which is fixed to an inner circumferential surface of an idler roller 2. A labyrinth seal 4 is fitted on and fixed to the shaft 1 in such a way as to be adjacent to the inner ring 6 at an external side of the inner ring 6 in an axial direction. A lip portion 4a at an outside diameter side of the labyrinth seal 4 is made to be brought into sliding contact with the bearing member. An internal portion of the labyrinth seal 4 is filled with grease.

DISCLOSURE OF THE INVENTION

Problems to be Solved by the Invention

In the conventional conveyor bearing 5, however, the construction of the labyrinth seal 4 is complex and a large volume of grease needs to be filled in the internal portion of the seal 4 in order to improve dustproofness and waterproofness.

In this way, since the labyrinth structure becomes complex, it is difficult not only to work but also to fabricate the conveyor bearing 5. Because of this, there is caused a problem that the working and fabricating costs are increased largely.

In addition, since the large amount of grease is sealed in the internal portion of the labyrinth seal 4, the amount of grease used is increased, leading to a problem that the fabrication costs are increased. In addition to this, since the torque of the idler roller 2 is increased, a motor having a larger output needs to be used to rotate the idler roller 2. As a result, there are caused problems that the amount of electric power used is increased and that the construction of the conveyor itself is also enlarged.

Accordingly, with a view to solving the conventional problems described above, it is an object of the invention to provide a low cost and compact conveyor bearing having dustproofness and waterproofness while achieving low torque.

Further object is to provide not only a conveyor bearing but a bearing, in particular, a rolling bearing which can also be applied to bearings which have similar problems as the conveyor bearing.

In order to achieve the object described above, according the invention, a conveyor bearing includes an inner ring fitted on and fixed to a shaft, a plurality of rolling elements arranged rollably on a raceway surface of the inner ring, an outer ring disposed rotatably relative to the inner ring via the rolling elements, and a seal member to seal in a grease between the outer ring and the inner ring, and the seal member having a plurality of seal lips is mounted on at least one location on the bearing.

Further, in order to achieve the object described above, according the invention, a conveyor bearing includes an inner ring fitted on and fixed to a shaft, a plurality of rolling elements disposed rollably on a raceway surface of the inner ring, an outer ring disposed rotatably relative to the inner ring via the rolling elements, and a seal member to seal in a grease between the outer ring and the inner ring, the seal member including two L-shaped annular members, each having an L-shaped radial section, fixed to axial end portions of the inner ring and the outer ring respectively with a given interval therebetween to oppose each other in an axial direction, and a seal lip is fitted to the L-shaped annular member on a side of the outer ring, the seal lip including a lip portion contacting the L-shaped annular member disposed on an axially outer side on a side of the inner ring, and a protruding portion forming a gap between the protruding portion and the L-shaped annular member on the side of the inner ring.

Further, in order to achieve the object described above, according the invention, a conveyor bearing includes an inner ring fitted on and fixed to a shaft, a plurality of rolling elements disposed rollably on a raceway surface of the inner ring, an outer ring disposed rotatably relative to the inner ring via the rolling elements, and a seal member to seal in a grease between the outer ring and the inner ring, the seal member including two L-shaped annular members, each having an L-shaped radial section, fixed to axial end portions of the inner ring and the outer ring respectively with a given interval therebetween to oppose each other in an axial direction, and the L-shaped ring member on a side of the inner ring side is disposed on an axially outer side such that a seal lip fitted on the L-shaped annular member on a side of the outer ring is brought into contact therewith.

More specifically, in the conveyor bearing of the invention, it is preferable that an outside diameter of the L-shaped annular member, on the side of the inner ring be set to be smaller than an outside diameter of the L-shaped annular member on the side of the outer ring.

Moreover, in the conveyor bearing of the invention, it is preferable that an outside diameter of the L-shaped annular member on the side of the inner ring be set to be larger than an outside diameter of the L-shaped annular member on the side of the outer ring, and that a protruding member be mounted on the L-shaped annular member on the side of the outer ring to narrow a space between the L-shaped annular member on the side of outer ring and the L-shaped annular member on the side of the inner ring.

Further, in order to achieve the object described above, according the invention, a conveyor bearing includes an inner ring fitted on and fixed to a shaft, a plurality of rolling elements disposed rollably on a raceway surface of the inner ring, an outer ring disposed rotatably relative to the inner ring via the rolling elements, and a seal member to seal in a grease between the outer ring and the inner ring, the seal member being an oil seal mounted on a radially inner surface of the outer ring, a radially outer surface of the inner ring, or a lateral surface of the outer ring or the inner ring.

Further, in the conveyor bearing of the invention, it is preferable that the oil seal be an oil seal press fitted to the radially inner surface of the outer ring, and that a portion of the radially inner surface where the oil seal is press fitted has a larger inside diameter than another portion of the radially inner portion of the outer ring by providing a step.

Moreover, in the conveyor bearing of the invention, it is preferable that the oil seal have two lip portions.

According to the means described above, it can also be used as a bearing which has similar problems to those of the conventional conveyor bearing. Preferably, although not particularly limited, it can also be applied to agricultural machines, construction machines, bridge installation, cargo machines and the like.

Advantages of the Invention

As described above, the seal lip on the L-shaped annular member on the side of the outer ring is brought into sliding contact with the L-shaped annular member on the side of inner ring, and therefore, the grease within the bearing sealed in tightly, and the dustproofness and waterproofness of the conveyor bearing can be ensured by the protruding portion (the labyrinth structure) of the seal lip.

In addition, since the grease sealing performance can be maintained by the low-torque seal lip so as to eliminate the labyrinth seal having the complex construction, the configuration can not only realize a reduction in torque of the idler roller but also contribute to reducing the costs and making the conveyor bearing compact in size.

In this way, the configuration can obviate the necessity of making any special investment in facility for assemblage of the conveyor, contributing to making the fabrication process simple.

In addition, as described above, according to the invention, the grease within the bearing can be sealed in and the dustproofness and waterproofness of the conveyor bearing can be ensured by the oil seal mounted in the internal portion of the conveyor bearing.

In addition, the mounting surface of the oil seal is the radially inner portion of the outer ring of the bearing which is the portion having the superior dimension accuracy. The sliding surface of the oil seal is the outside diameter portion of the inner ring of the bearing which is also the portion having the superior dimension accuracy. Further, the concentricity between the bore portion of the outer ring of the bearing and the outside diameter portion of the inner ring of the bearing is suppressed to on the order of the radial gap of he bearing. Therefore, since the lip portions of the oil seal slide in a stable fashion, the torque change or fluctuation due to the sliding of the oil seal can be made small, and the absolute value of toque can also be made small and stable.

In addition, since the oil seal is installed in advance in the internal portion of the bearing, the construction becomes simple, and no special investment has to be made in facility for assemblage of the conveyor. Thus, the configuration can contribute to making the fabrication process simple.

BEST MODE FOR CARRYING OUT THE INVENTION

Hereinafter, respective embodiments of conveyor bearings according to the invention will be described in detail by reference to the drawings.

(First Embodiment)

FIGS. 1 to 5 are axial sectional views showing a conveyor bearing of a first embodiment.

Figure 6:
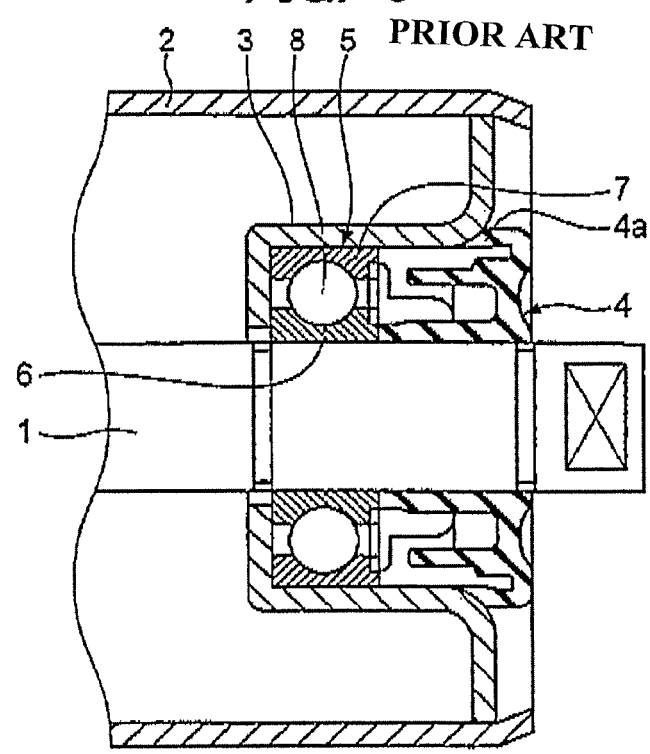
FIG. 6 is an axial sectional view for explaining an idler roller having a conventional conveyor bearing.

As shown in FIG. 6 which depicts the related art, a conveyor bearing 10 of this embodiment is mounted in the bearing member 3 of the idler roller 2 in such a way as to be fitted therein in place of the conveyor bearing 5, and descriptions on an overall configuration of the conveyor bearing 10 will be omitted here which would repeat the same descriptions made on the conveyor bearing 5 of the related art.

Figure 1:
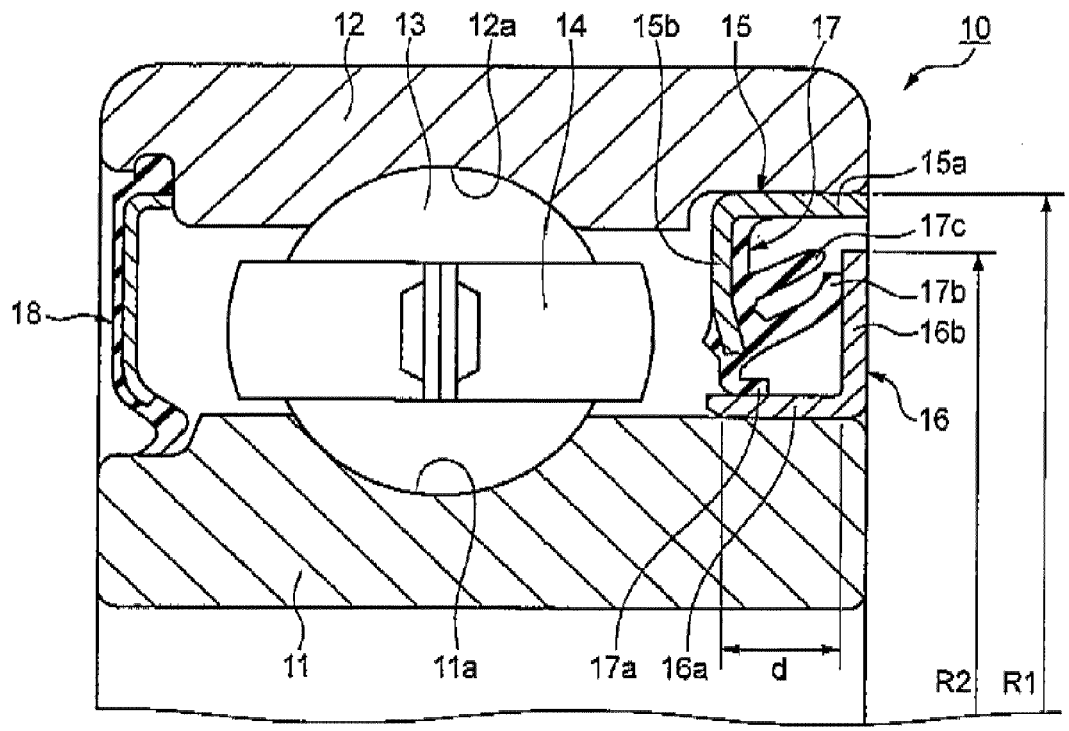
FIG. 1 is an axial sectional view for explaining a first embodiment of a conveyor bearing according to the invention.

As shown in FIG. 1, the conveyor bearing 10 of this embodiment has an inner ring 11 which is fitted on and fixed to a shaft, not shown, and which has a raceway surface 11a on an outer circumferential surface thereof, a plurality of balls 13 disposed reliably on the raceway surface 11a of the inner ring 11, and an outer ring 12 which has a raceway surface 12a on an inner circumferential surface thereof and which is disposed rollably relative to the inner ring 11 via the balls 13. The plurality of balls 13 are retained rollably within a cage 14, and the outer ring 12 is fixedly fitted in a bearing member (refer to FIG. 6) of an idler roller, not shown. Large and small-diameter L-shaped annular members 15, 16 serving as a seal member for these components have an L-shaped radial section. An outside diameter R1 of the large-diameter L-shaped annular member 15 is set larger than an outside diameter R2 of the small-diameter L-shaped annular member 16 (R1>R2).

To describe in detail, the large-diameter L-shaped annular member 15 is fixed to a bore side of an axially outer end portion of the outer ring 12, and the small-diameter L-shaped annular member 16 is fixed to an outside diameter side of an axially outer end portion of the inner ring 11 so as to face the large-diameter L-shaped annular member 15 in an axial direction with a distance d therebetween in an external position (Note that when used in this description, in and out refer to a positional relationship with the bearing. In addition, the small-diameter L-shaped annular member 16 and a member having the same function as that of the same annular member 16 may be referred to as a slinger from time to time.).

The large-diameter L-shaped annular member 15 includes a cylindrical portion 15a which is fixed to an inner circumferential surface of the axially outer end portion of the outer ring 12 and a circular disc portion 15b extends radially inwards from an axially inner end of the cylindrical portion 15a. In addition, the small-diameter L-shaped annular member 16 includes a cylindrical portion 16a which is fixed to an outer circumferential surface of the axially outer end portion of the inner ring 11 and a circular disc portion 16b which extends radially outwards from an axially outer end of the cylindrical portion 16a. Thus, the cylindrical portion 15a of the large-diameter L-shaped annular member 15 and the cylindrical portion 16a of the small-diameter L-shaped annular member 16 face each other in a radial direction. Then, the circular disc portion 15b of the large-diameter L-shaped annular member 15 is present further axially inwards than the circular disc portion 16b of the small-diameter L-shaped annular member 16 and faces the circular disc portion 16b in the axial direction. Predetermined gaps are provided between a bore side end portion of the circular disc portion 15b and an outer circumferential surface of the cylindrical portion 16a and between an outside diameter side end portion of the circular disc portion 16b and an inner circumferential surface of the cylindrical portion 15a.

A seal lip 17 is secured to the circular disc portion 15b of the large-diameter L-shaped annular member 15. Two lip portions 17a, 17b of this seal lip 17 are brought into sliding contact with the circular disc portion 16a of the small-diameter L-shaped annular member 16 and an internal surface if the circular disc portion 16b, respectively.

A further lip portion of the sea lip 17 forms a lip-shaped protruding portion 17c which is substantially parallel to an outer circumferential side of the lip portion 17b. This protruding portion 17c is disposed so as not to be in contact with the circular disc portion 16 of the small-diameter L-shaped annular member 16 but to define a slight gap between the circular disc portion 16b and itself, whereby a labyrinth structure is produced. A space which is defined by the lip portion 17a, the large-diameter L-shaped annular member 15, the outer ring 12, the balls 13 and the inner ring 11 is filled with grease.

In this configuration, when the idler roller (refer to FIG. 6) rotates, the lip portions 17a, 17b of the seal lip 17 of the large-diameter L-shaped annular member 15 are brought into sliding contact with the cylindrical portion 16a and the internal surface of the circular disc portion 16b of the small-diameter L-shaped annular member 16, respectively, whereby the grease within the bearing 10 is sealed therein and dust and water is made difficult to intrude into the bearing 10 from an external portion by the labyrinth structure by the protruding portion 17c. Therefore, the sealing performance is increased, and the dustproofness and waterproofness of the bearing 10 can be ensured.

In this way, the sealing performance of grease is maintained by the low-torque seal lip 17 and the conventional labyrinth seal having the complex construction can be omitted. Therefore, this configuration can not only realize a reduction in torque of the idler roller but also contribute to reducing the costs and making the bearing 10 compact.

In this embodiment, as a seal at an opposite side of the conveyor bearing a seal 18 of a type having a lip in sliding contact with the inner and outer rings is installed.

A press-fit placing method may be used to place the outer roller 12 in a housing portion of the roller and the inner ring 11 on the shaft. In addition, other placing methods using an adhesive and involving an elastic resin material may also be adopted.

In addition, since the construction can be made simple, no special investment has to be made in facility for assemblage of the conveyor. Thus, the configuration can contribute to making the fabrication process simple.

Figure 2:
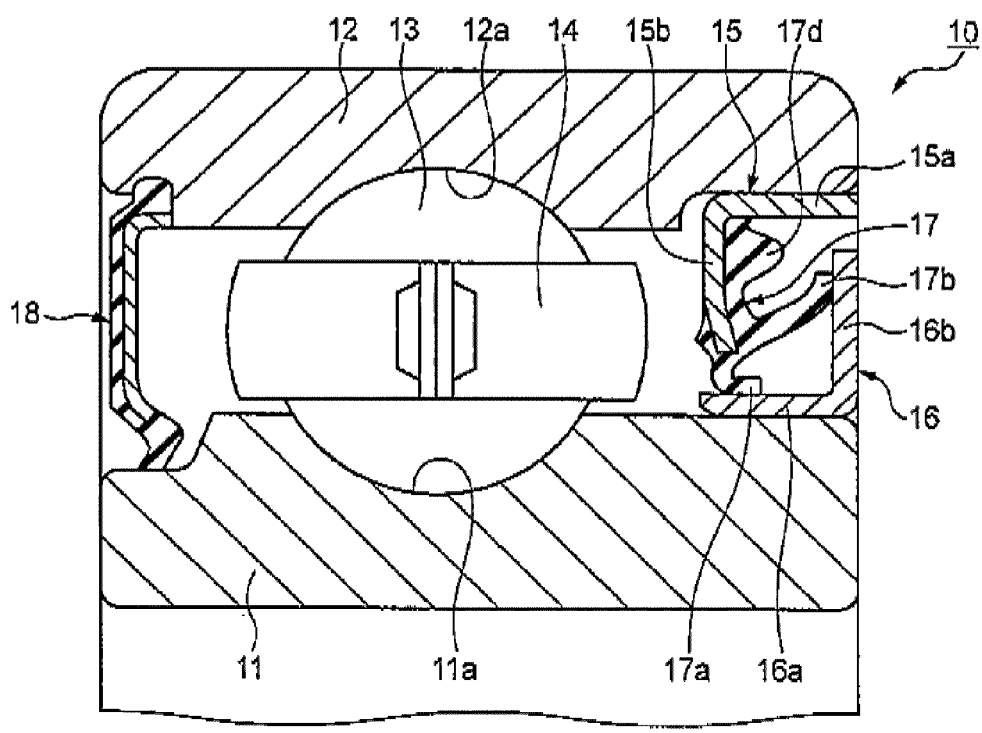
FIG. 2 is an axial sectional view for explaining another example of a conveyor bearing of the first embodiment.

In this embodiment, while the lip-shaped protruding portion 17c is provided on the seal lip 17 to form the labyrinth structure, the invention is not limited to this configuration. For example, as shown in FIG. 2, a configuration may be adopted in which a bump-shaped protruding portion 17d is provided. In short, any construction which can narrow the distance d between the large-diameter L-shaped annular member 15 and the small-diameter L-shaped annular member can be adopted as the labyrinth structure.

In this embodiment, while the seal 18 of the type having the lip in sliding contact with the inner and outer rings of the bearing is installed as the seal at the opposite side, there is no special limitation imposed on the form of the seal at the opposite side.

Here, although not limited to the application to the first embodiment, by taking the first embodiment as an example, preferred forms of the members configuring the sealing portion including seal lips will be described by reference to FIG. 3.

Figure 3:
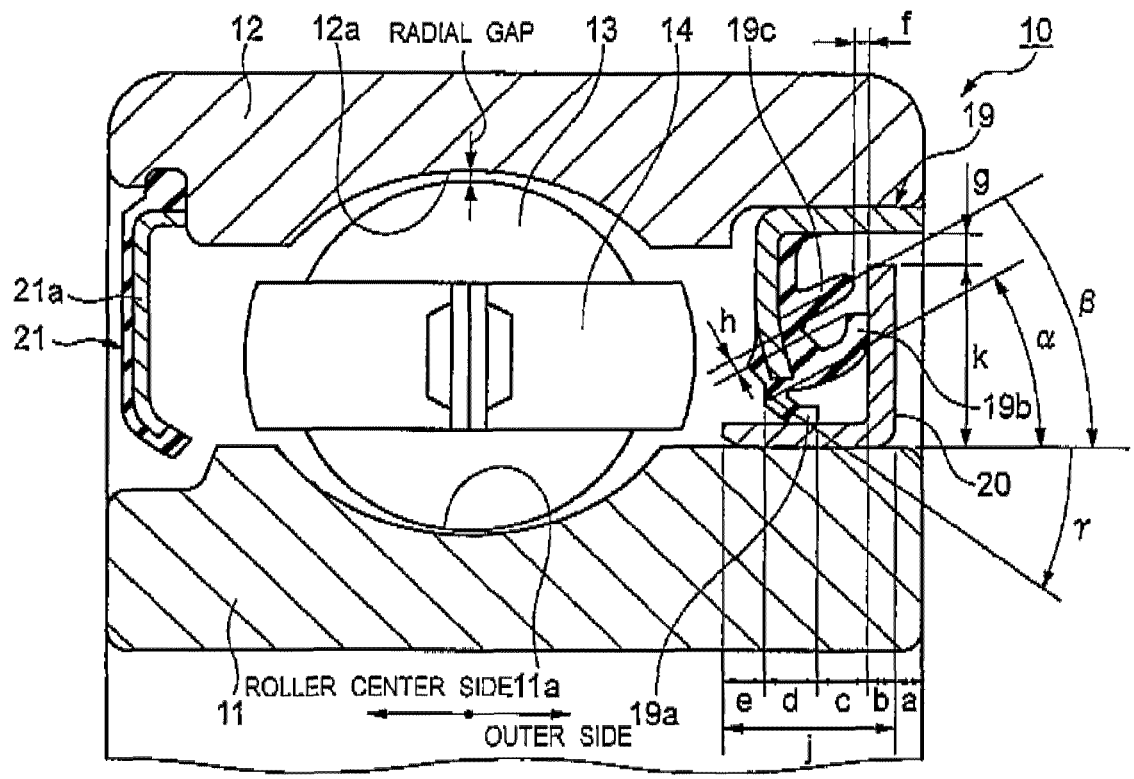
FIG. 3 is an axial sectional view for explaining a further example of a conveyor bearing of the first embodiment.

FIG. 3 shows another example of the first embodiment which is applied to a conveyor idler roller. A seal 19 having two contact lips 19a, 19b and one non-contact lip 19c and a slinger 20 are mounted in an opening portion on an external side of a bearing. A non-contact rubber seal 21 including a core metal 21a is mounted in an opening on an opposite side (a roller side) of the bearing. As this occurs, since the seal 21 on the roller center side is of the non-contact type, this form has a superior low torque performance, Here, a bearing used in a conveyor idler roller normally has a radial gap and an axial gap, and there are possibilities that the bearing moves by a distance equal to the radial gap in a radial direction and moves by a distance equal to the axial gap in an axial direction while in use. When considering based on the inner ring of the bearing, the outer ring moves by the distance equal to the radial gap in the radial direction and moves by the distance equal to the axial gap in the axial direction while in use.

In the event that such radial and axial gaps are nil or minus under a certain condition, an unnecessary load will be exerted on the respective portions of the bearing under other conditions, and therefore, these gaps are necessary ones. Appropriate gas are provided depending on conditions under which the conveyor idler roller is used and conditions under which the bearing is used.

When a high-accuracy rotating condition is required, a construction is adopted in which a so-called preload is given. However, this construction generally increases the number of components and the number of assembling manhours. Consequently, normally, a form is adopted which involves no preload construction but has a radial gap and an axial gap.

Because of this, a radial dimension of the contact lip 19a is preferably a dimension which can allow itself to maintain the sliding contact with the slinger 20 even in the event that the inner and outer rings 11, 12 move by the distance equal to the radial gap in the radial direction.

Next, an axial dimension of the contact lip 19b needs to be a dimension which prohibits the contact lip 19b from departing from the axial sliding contact surface of the slinger 20 and from being brought into contact with the non-contact lip 19c even in the event that the inner and outer rings 11, 12 move by the distance equal to the axial gap. Consequently, assuming that the inner and outer rings 11, 12 stay in their neutral positions in the state shown in FIG. 3, a distance equal to half the axial gap needs to be ensured for a dimension e and a dimension c in the figure.

In addition, it is preferable that the sliding contact portion of the slinger 20 which is in contact with the contact lip 19a is not entirely exposed to spaces on the roller center side and the external side of the bearing even in the event that the inner and outer rings 11, 12 move in the radial direction. By part of the sliding contact surface of the slinger 20 being normally brought into contact with the contact lip 19a, at least part of the sliding contact surface is prevented from being in contact with muddy water, dust and further air which intrude from the outside, a good sealing performance being thereby maintained. Consequently, a dimension equal to or larger than the axial gap preferably needs to be ensured for a dimension d of a contact portion of the contact lip 19a. Further, since a curved surface is produced at a bent portion of the contact lip 19a, it is preferable that an axial length of the true contact of the contact lip 19a is larger than the axial gap in consideration of the curved surface. It is more preferable that in consideration of a movement resulting from the radial gap (which is normally one tenth the axial gap), the dimension d of the contact portion of the contact lip 19a is larger than a total of the axial gap and the radial gap. It is most preferable that the axial length of the true contact of the contact lip 19a is longer than the total of the axial gap and the radial gap. Further, it is preferable to take into consideration tolerances for the inclination of the inner and outer rings 11, 12, the outside diameter of the inner ring 11 and the bore diameter of the outer ring 12.

However, in the event that the contact lips 19a, 19b are too long, it influences in various ways. For example, torque is increased due to an increase in sliding contact surface, a widthwise dimension of the bearing is increased, and possibilities are increased that the lips are damaged in the fabrication process. In addition, in the event that the axial length of the slinger 20 is short, a problem tends to be caused that the installation of the slinger 20 becomes unstable. Consequently, an upper limit length of the sliding contact portion of the slinger 20 where the lips are brought into sliding contact is preferably on the order of 5 mm or smaller. A lower limit of the axial length J of the slinger 20 is preferably on the order of a radial length k of the slinger 20×0.2 mm or smaller. It is most preferable that the axial length J of the slinger 20 is the radial length k of the slinger 20 or smaller and 0.2 time the radial length k of the slinger 20 or larger.

Next, similar to the contact lip 19a, it is preferable that the contact lip 19b also takes such a dimension that the sliding contact with the slinger 20 is maintained and the whole of the sliding contact surface with the slinger 20 is not exposed even in the event that the inner and outer rings 11, 12 move relatively. Although it is true with an upper limit, it is preferable that a radial length of the slinger 20 is set to such an extent that a gap g becomes as small as possible and the bore side of the outer ring 12 is not brought into contact with the slinger by the relative movement of the inner and outer rings 11, 12.

It is preferable that the non-contact lip 19c is set so as not to be brought into contact with the slinger even in the event that the inner and outer rings 11, 12 move relatively by the distance equal to the axial gap. Specifically speaking, it is preferable that a gap f is secured longer than the axial gap. In the event that the non-contact lip 19c comes into contact with the slinger 20, an increase in torque is called for, which is not preferred. However, in the event that the gap f is too large, since muddy water or the like intrudes into the bearing easily, it is preferable that an upper limit of the gap f is of the order of 5 mm or smaller. It is more preferable that the gap f is determined so that a gap of 1 mm or smaller is ensured even in the event that the inner and outer rings 11, 12 move to their largest extents in the axial direction in consideration of the axial gap. Further, the gap is preferably 0.7 mm or smaller. It is most preferable that the gap f is 0.7 mm or smaller at its largest extent and the gap f is determined so that a gap of 0.1 mm or larger is ensured even in the event that the gap f becomes the smallest as a result of the inner and outer rings 11, 12 moving relatively to their largest extents in the axial direction.

An angle $\alpha$ of the contact lip 19b and an angle $\beta$ of the non-contact lip 19e are substantially the same or the same, and it is preferable that these angles fall in a range of 5° to 85°. It is more preferable that the angles fall in a range of 10° to 50°. It is further more preferable that the angles fall in a range of 15° to 45°. It is most preferable that the angles fall in a range of 20° to 40° and a difference between the angle $\alpha$ and the angle $\beta$ stays within 5°. In addition, it is preferable that an angle $\gamma$ of the contact lip 19a falls within a range of 5° to 85°. It is more preferable that the angle falls in a range of 10° to 50°. It is further more preferable that the angle falls in a range of 15° to 45°. It is most preferable that the angle falls in a range of 20° to 40°.

In addition., it is preferable to determine a distance h between the contact lip 19b and the non-contact lip 19c so that they are not brought into contact with each other even in the event that the inner and outer rings 11, 12 move relatively by the distance equal to the axial gap in consideration of the angle $\alpha$ and the angle $\beta$.

It should be ensured that a dimension a needs to be larger than at least the axial gap so that the slinger 20 does not protrude out of the width of the outer ring 12. Further, it is preferable that the dimension a becomes larger than a dimension along which chamfering is applied between a raidally inner portion and a lateral surface portion of the inner ring 11.

It is desirable that the non-contact rubber seal 21 is also set so that the non-contact lip portion does not come into contact with the inner ring 11 and extend over an excessive distance in consideration of the axial gap and the radial gap.

With these configurations, the sliding contact of the sliding surfaces with the contact lips 19a, 19b provided on the bearing 10 is stabilized, and the non-contact lip 19c does not come into contact with the bearing 10. Therefore, the rotation torque is reduced and becomes stable. Further, the sliding contact of the sliding surfaces with the contact lips 19a, 19b becomes stable, and the non-contact lip 19c and the bearing 10 face each other with a required minimum gap therebetween. Therefore, the intrusion of foreign matters such as muddy water into the bearing 10 can be prevented effectively.

Figure 4:
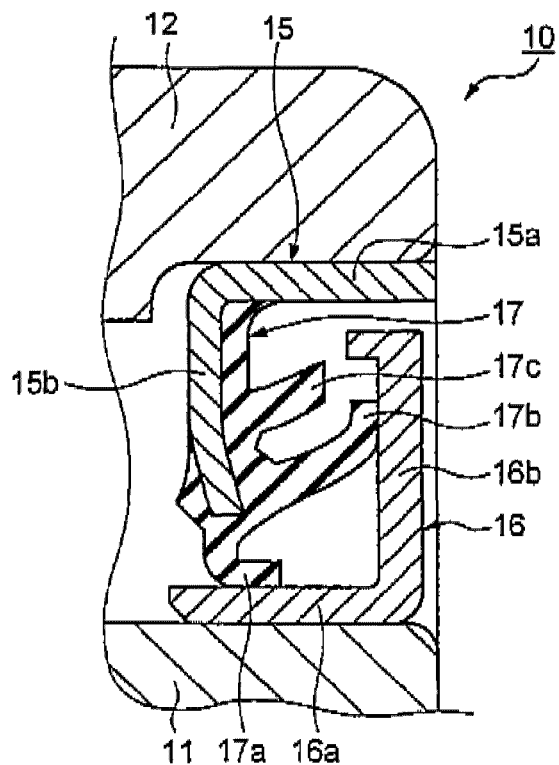
FIG. 4 is an enlarged sectional view of a main part for explaining another example of a conveyor bearing of the first embodiment.
Figure 5:
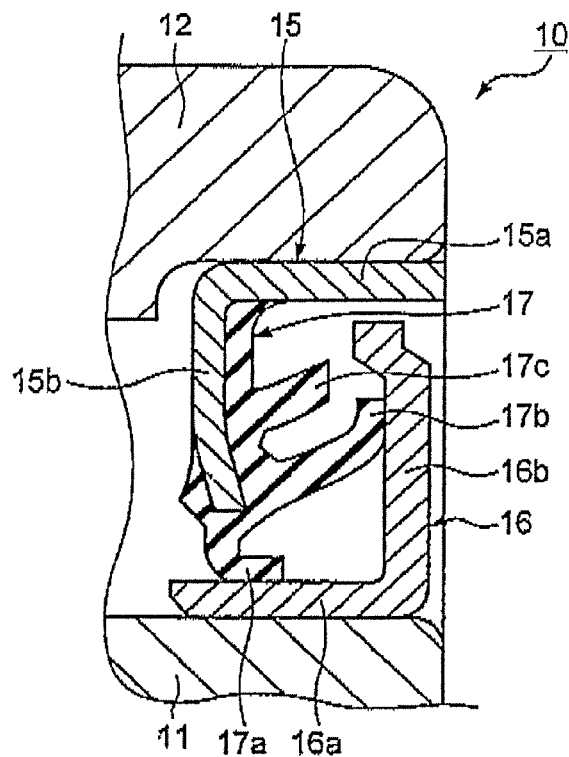
FIG. 5 is an enlarged sectional view of a main part for explaining a further example of a conveyor bearing of the first embodiment.

Further, with the dimensional relationships maintained, as shown in FIGS. 4 and 5, slingers 20 having shapes which are modified in various ways can be used such as one in which a distal end portion of a circular disc portion 16b is bent in the axial direction.

(Second Embodiment)

Figure 7:
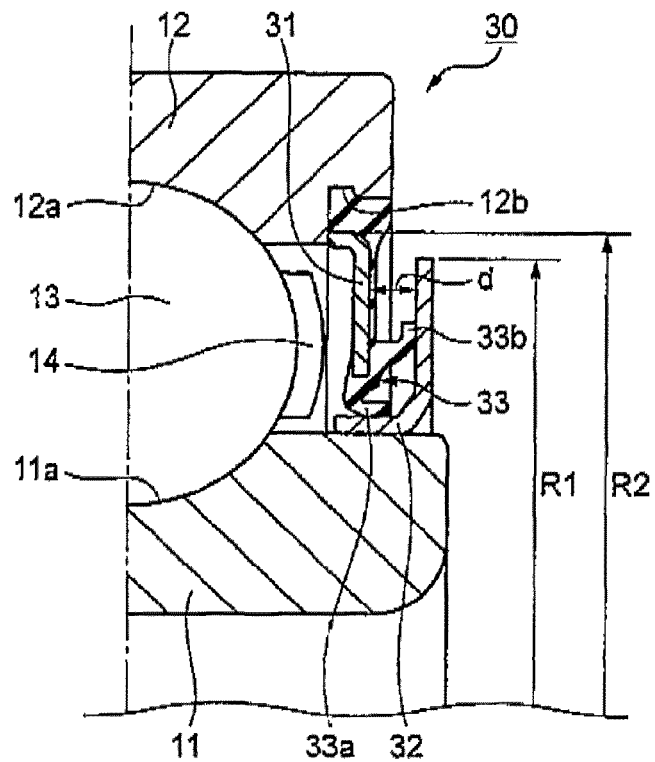
FIG. 7 is an axial sectional view for explaining a second embodiment of a conveyor bearing according to the invention.

FIG. 7 is an axial sectional view showing a conveyor bearing of a second embodiment. In the figure, like reference numerals will be given to portions which are like or similar to those of the first embodiment, and the description thereof will be omitted or simplified.

As shown in FIG. 6 which depicts the related art, a conveyor bearing 30 of this embodiment is mounted in the bearing member 3 of the idler roller 2 in such a way as to be fitted therein in place of the conveyor bearing 5, and descriptions on an overall configuration of the conveyor bearing 30 will be omitted here which would repeat the same descriptions made on the conveyor bearing 5 of the related art.

As shown in FIG. 7, the conveyor bearing 30 of this embodiment includes an inner ring 11 which is fitted on and fixed to a shaft, not shown, a plurality of balls 13 disposed rollably on a raceway surface 11a of the inner ring 11, and an outer ring 12 which is disposed rollably relative to the inner ring 11 via the balls 13. The outer ring 12 is fixedly fitted in a bearing member (refer to FIG. 6) of an idler roller, not shown.

A first L-shaped annular member 31, serving a seal member, is fixed to a bore side end portion at an external side of the outer ring 12 in an axial direction. A second L-shaped annular member 32 is fixed to an outside diameter side end portion at an external side of the inner ring 11 in the axial direction so as to face the first L-shaped annular member 31 in the axial direction in an external position with a distance d therebetween.

The first and second L-shaped annular members 31, 32 each have an L-shaped radial section. The first L-shaped annular member 31 has a circular disc portion which extends in a radial direction and a cylindrical portion which is formed to be bent towards an inside of the bearing at an outside diameter side end portion of the circular disc portion. An end portion of this cylindrical portion is fixed in a notch 12b which is formed in the bore side end portion at the external side of the outer ring 12 in the axial direction. The second L-shaped member 32 includes a circular disc portion which extends in the radial direction and a cylindrical portion which is formed to be bent towards the inside of the bearing at a bore side end portion the circular disc portion. An inner circumferential surface of the cylindrical portion is fitted on and fixed to an outer circumferential surface of he inner ring. In addition, an outside diameter R1 of the second L-shaped annular member 32 is set smaller than an outside diameter R2 of the first L-shaped annular member 31 (R1<R2).

A seal lip 33 is fitted on and fixed to a bore side end portion of the first L shaped annular member 31. Two lip portions 33a, 33b of the seal lip 33 are brought into sliding contact with an internal surface of the second L-shaped annular member 32. Namely, the lip portion 33a is disposed so as to be brought into contact with an outer circumferential surface of the cylindrical portion of the second L-shaped annular member 32, and the other lip portion 33b is disposed so as to be brought into contact with an inner circumferential surface of the circular disc portion of the second L-shaped annular member 32 to thereby produce a labyrinth structure. A space defined by the lip portion 33a, the first L-shaped annular member 31, the outer ring 12, the balls 13 and the inner ring 11 is filled with grease.

In this configuration, when the idler roller (refer to FIG. 6) rotates, the lip portions 33a, 33b of the seal lip 33 of the first large-diameter L-shaped annular member 31 are brought into sliding contact with the second L-shaped annular member 32, respectively, whereby the grease within the bearing 30 is sealed therein, and dust and water are made difficult to intrude into the bearing 30 from an external portion by the labyrinth structure. Therefore, the sealing performance is increased, and the dustproofness and waterproofness of the bearing 30 can be ensured.

Figure 8:
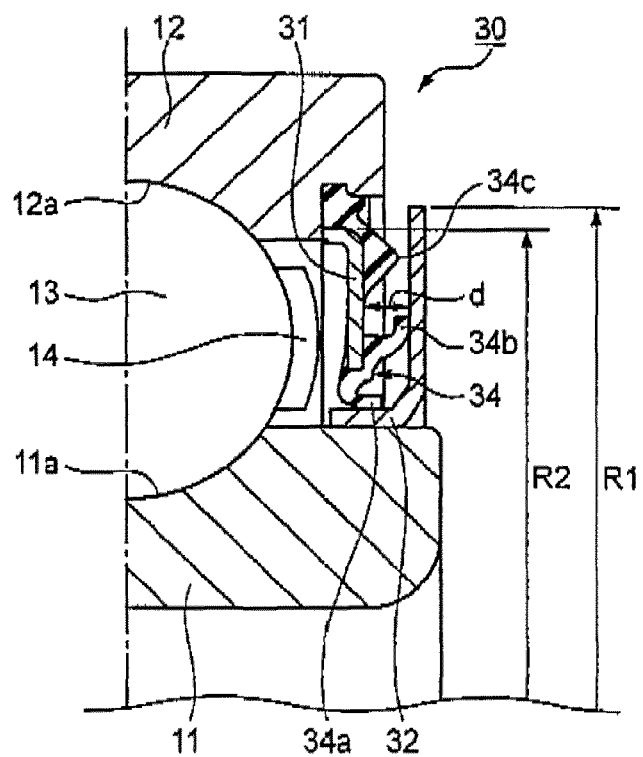
FIG. 8 is an axial sectional view for explaining another example of a conveyor bearing of the second embodiment.

FIG. 8 shows another example of the second embodiment, and in this example, an outside diameter R1 of a second L-shaped annular member 32 is set larger than an outside diameter R2 of a first L-shaped annular member 31 (R1>R2).

A seal lip 34 is fitted on and fixed to a bore side end portion of the first L-shaped annular member 31. Two lip portions 34a, 34b of this seal lip 34 are brought into sliding contact with an internal surface of the second L-shaped annular member 32. Namely, the lip portion 34a is disposed so as to be brought into contact with an outer circumferential surface of a cylindrical portion of the second L-shaped annular member 32, and the other lip portion 34b is disposed so as to be brought into contact with an internal surface of the cylindrical portion of the second L-shaped annular member 32. A space defined by the lip portion 34a, the second L-shaped annular member 32, an outer ring 12, balls 13 and an inner ring 11 is filled with grease.

Further, a protruding portion 34c having a shape which narrows a distance d between the first L-shaped annular member 31 and the second L-shaped annular member 32 is fitted on and fixed to an outside diameter side of a circular disc portion and an outer circumferential surface of a cylindrical portion of the first L-shaped member 31 and in a notch portion 12b in the outer ring 12, so as to produce a labyrinth structure.

In this configuration, when the idler roller (refer to FIG. 6) rotates, the lip portions 34a, 34b of the seal lip 34 of the first large-diameter L-shaped annular member 31 are brought into sliding contact with the second L-shaped annular member 32, respectively, whereby the grease within the bearing 30 is sealed therein, and dust and water are made difficult to intrude into the bearing 30 from an external portion as a result of the outside diameter R1 of the second L-shaped annular member 32 being larger than the outside diameter R2 of the first L-shaped annular member 31 and by the labyrinth structure by the protruding portion 34c. Therefore, the sealing performance is increased, and the dustproofness and waterproofness of the bearing 30 can be ensured.

In this way, the sealing performance of grease is maintained by the low-torque seal lip 34 and the conventional labyrinth seal having the complex construction can be omitted. Therefore, this configuration can not only realize a reduction in torque of the idler roller but also contribute to reducing the costs and making the bearing 30 compact.

In addition, since the simple construction can be realized, no special investment in facility for assemblage of the conveyor has to be made, and the configuration can contribute to making the fabrication process simple.

(Third Embodiment)

Figure 9:
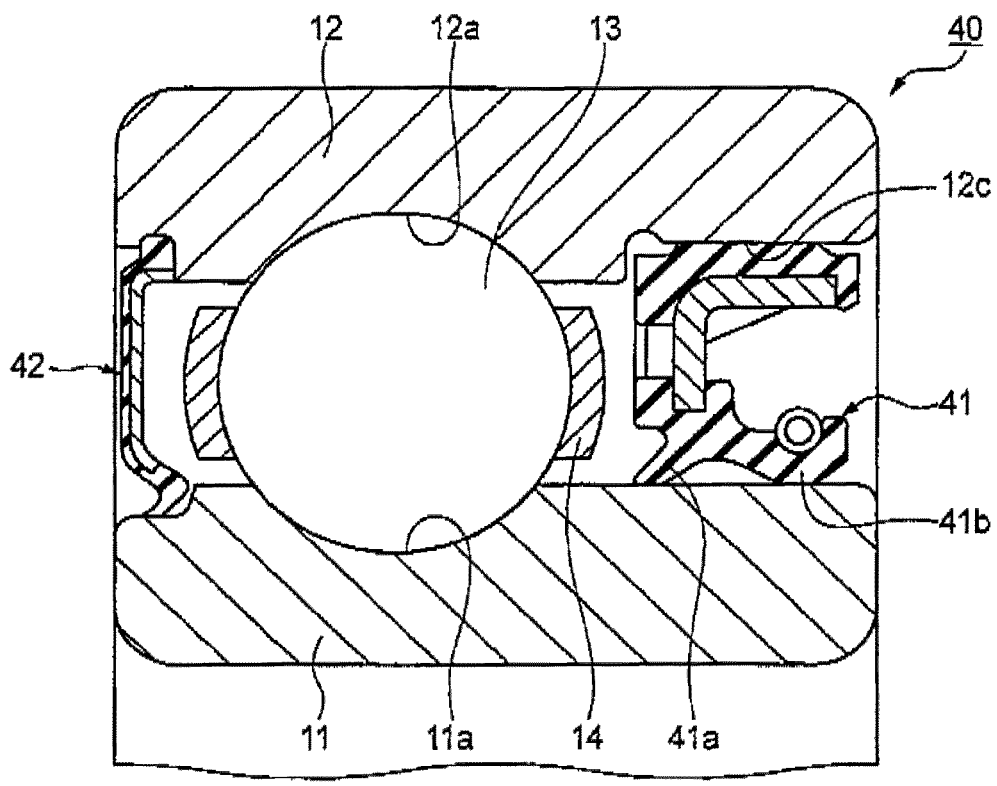
FIG. 9 is an axial sectional view for explaining a third embodiment of a conveyor bearing according to the invention.

FIG. 9 is an axial sectional view showing a conveyor bearing of a third embodiment. In the figure, like reference numerals will be given to portions which are like or similar to those of the first embodiment, and the description thereof will be omitted or simplified.

As shown in FIG. 6 which depicts the related art, a conveyor bearing 40 of this embodiment is mounted in the bearing member 3 of the idler roller 2 in such a way as to be fitted therein in place of the conveyor bearing 5, and descriptions on an overall configuration of the conveyor bearing 40 will be omitted here which would repeat the same descriptions made on the conveyor bearing 5 of the related art, The conveyor bearing 40 of this embodiment is such that one of seal portions between an inner ring 11 and an outer ring 12 is made to function as an oil seal 41. The oil seal 41 is installed in a bore extended portion 12c which is formed in a stepped manner in a radially inner surface of the outer ring 12 in a press fitted state. Two Lip portions 41a, 41b thereof are brought into sliding contact with a radially outer surface of the inner ring 11.

In this embodiment, a contact seal 42 is installed as a seal installed at an opposite side to the oil seal 41. In place of the contact seal 42, a non-contact seal or a shield plate may be installed.

By sealing grease in a space defined by the two lip portions 41a, 41b of the oil seal 41, an increase in torque due to due to the lip portions 41a, 41b being in sliding contact with the inner ring 11 can be suppressed and the intrusion of dust and water from an external portion can be prevented effectively.

Figure 10:
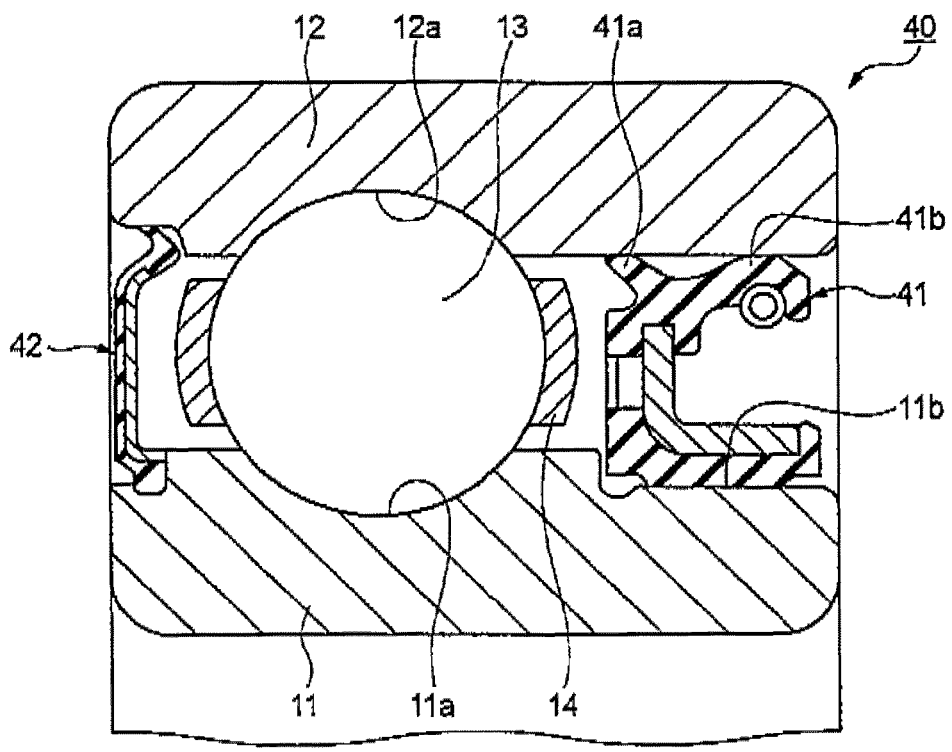
FIG. 10 is an axial sectional view for explaining another example of a conveyor bearing of the third embodiment.

FIG. 10 shows another example of a conveyor bearing of the third embodiment. In this example, an oil seal 41 is installed in an outside diameter extended portion 11b which is formed in a stepped manner in a radially outer surface of the inner ring 11 in a press fitted state. Two lip portions 41a, 41b thereof are brought into sliding contact with a radially inner surface of the outer ring 12. Normally, a conveyor bearing is used in such a state that an outer ring rotates. Because of this, in this example, the oil seal 41 itself does not rotate, and no centrifugal force is exerted on the oil seal 41. Therefore, the oil seal 41 can be brought into sliding contact with the outer ring 12 in a stabler fashion.

Figure 11:
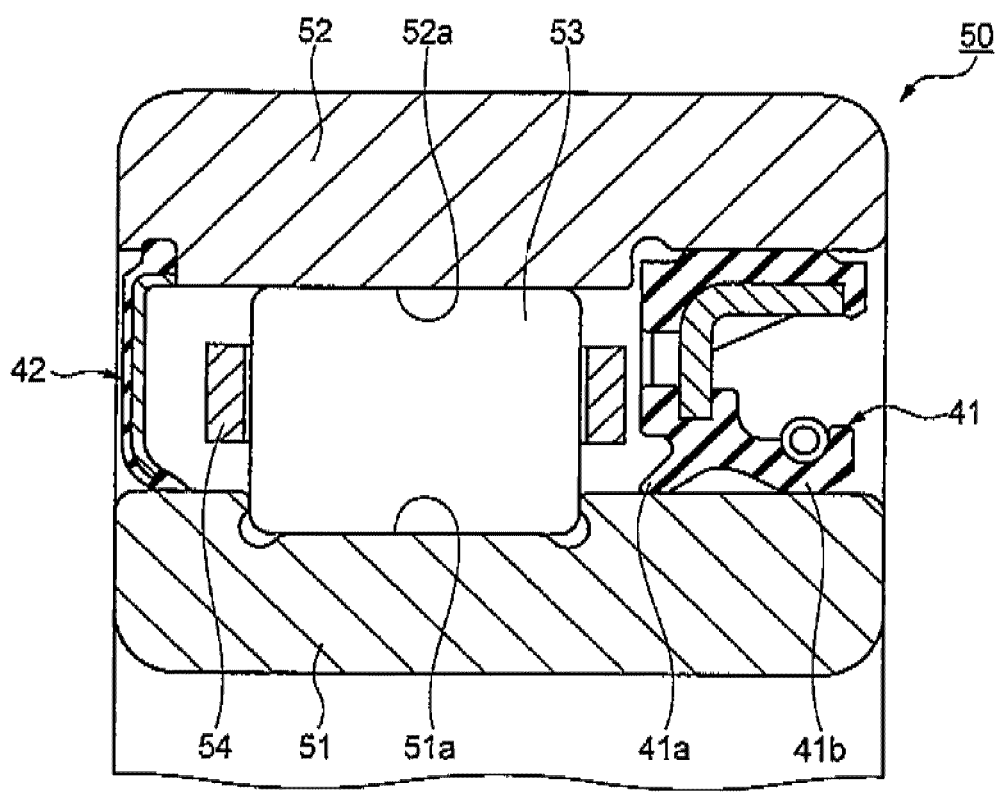
FIG. 11 is an axial sectional view for explaining a further example of a conveyor bearing of the third embodiment.

FIG. 11 shows a further example of a conveyor bearing of the third embodiment, and in this example, the invention is applied to a conveyor cylindrical roller bearing 50. This cylindrical roller bearing 50 has an inner ring 51 having a raceway surface 51a on an outer circumferential surface thereof, a plurality of rollers 53 which are disposed rollably on the raceway surface 51a of the inner ring 51, an outer ring 52 which has a raceway surface 52a on an inner circumferential surface thereof and which is disposed rotatably relative to the inner ring 51 via the rollers 53 and a cage 54 which holds the plurality of rolls 53 rollably. The oil seal 41 is installed in a bore extended portion 52b which is formed on a radially inner surface of the outer ring 52 in a stepped manner. A contact seal 42 is installed at an opposite side to the oil seal 41.

In any of the embodiments of tie invention, the bearing type is not limited to deep groove ball bearings, and hence, the invention can also be applied to roller bearings such as cylindrical roller bearings, tapered roller bearings, self-aligning roller bearings and needle roller bearings, ball bearings such as angular contact ball bearings and multi-point contact ball bearings and further combinations of these bearing types and those types of roller and ball bearings in which rollers and balls are arranged in double rows.

(Fourth Embodiment)

Figure 12:
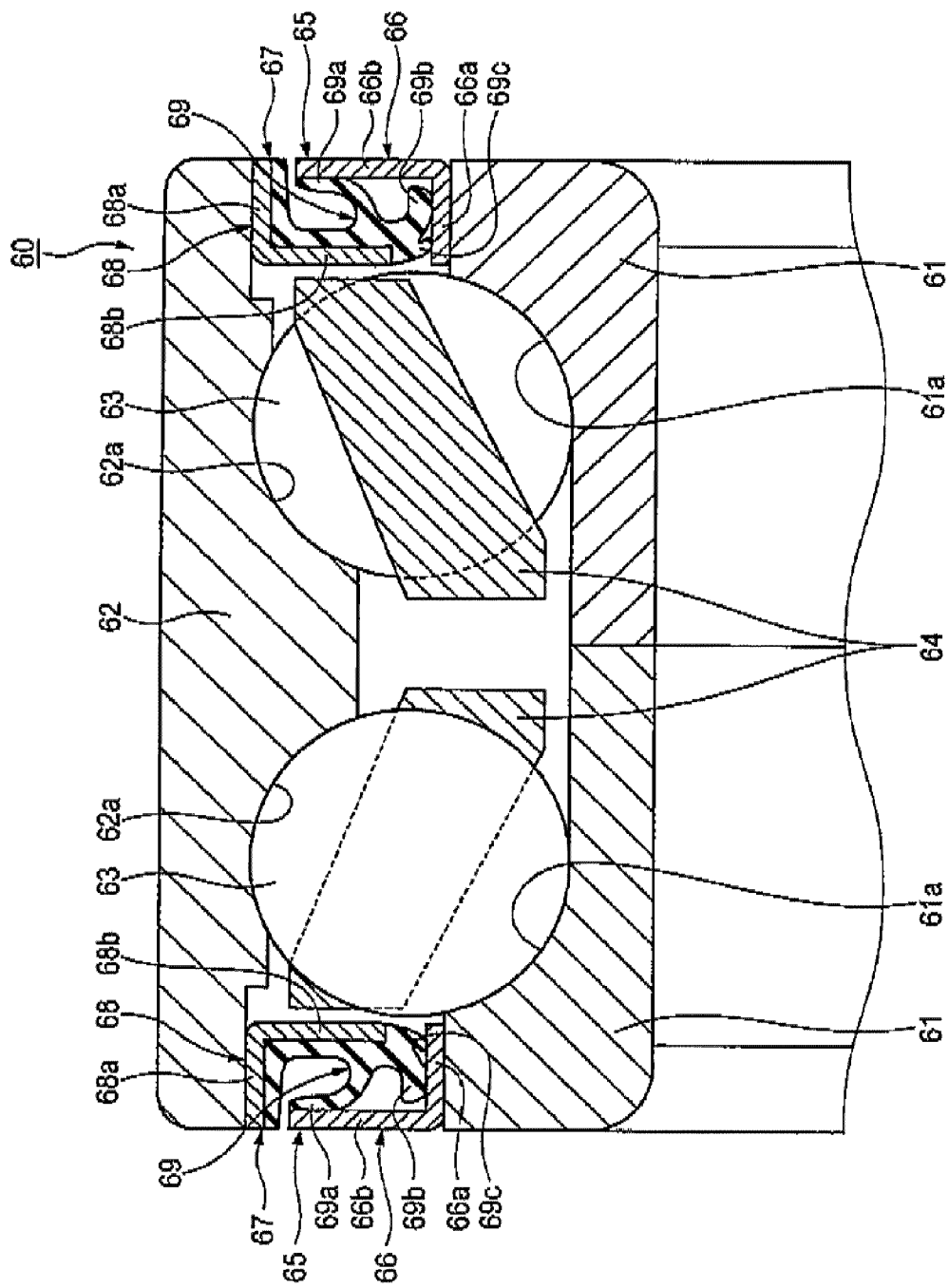
FIG. 12 is an axial sectional view for explaining a fourth embodiment of a conveyor bearing according to the invention.

FIG. 12 is an axial sectional view showing a conveyor bearing of a fourth embodiment.

This embodiment is such that a double-row rolling bearing is adopted as the type of a bearing in the first to third embodiments. Namely, similar features to those of the first to third embodiments can be applied to this embodiment except that the type of a bearing is the double-row rolling bearing.

By making a rolling bearing into a double-row rolling bearing, a thin rolling bearing can be realized in which a difference is small between a bore diameter dimension of an inner ring and an outside diameter of an outer ring, and a space which is occupied by the bearing in a radial direction can be reduced without reducing the load resistance performance thereof.

A double-row angular contact ball bearing 60 of this embodiment includes, as shown in FIG. 12, inner rings 61, 61 which each have a raceway surface 61a on an outer circumferential surface, a plurality of balls 63 which are disposed rollably on the raceway surfaces 61a, 61a of the inner rings 61, 61, an outer ring 62 which has raceway surfaces 62a, 62a on an inner circumferential surface and which is disposed rotatably relative to the inner rings 61, 61 via the balls 63, and a cage 64 which retains the plurality of balls 63 rollably.

Spaces between the inner rings 61, 61 and the outer ring 62 are sealed up by seal devices 65, 65, and the seal devices 65 each include a metallic slinger 66 and a seal member 67 which is formed by integrating a seal 69 made of an elastic material with a metallic L-shaped annular member 68.

The slinger 66 is an annular member which has a substantially L-shaped section and has a radially inner side cylindrical portion 66a which is free to be fitted on and fixed to an outer circumferential surface of an external end portion of the inner ring 61 and an outer side circular ring portion 66b which is bent radially outwards from an external end edge of the radially inner side cylindrical portion 66a in an axial direction.

The L-shaped annular member 68 is an annular member having a substantially L-shaped section and has an radially outer cylindrical portion 68a which is free to be fixedly fitted in an inner circumferential surface of an external end portion of the outer ring and an inner side circular ring portion 68b which is bent radially inwards from an internal end edge of the radially outer cylindrical portion 68a in the axial direction.

The seal 69 includes three external, intermediate and internal seal lips 69a, 69b, 69c. A distal end edge of the external seal lip 69a which is positioned most outwards is brought into sliding contact with an internal surface of the outer side circular ring portion 66b of the slinger 66 along the full circumference thereof, and distal end edges of the two remaining intermediate seal lip 69b and internal seal 69c are brought into sliding contact with an outer circumferential surface of the bore side circular cylindrical portion 66a along the full circumference thereof, whereby a high sealing performance is exhibited.

As the type of double-row rolling bearings, the invention is not limited to the double-row angular contact ball bearing 60 shown in FIG. 12 and hence can also be applied to double-row deep groove ball bearings, double-row cylindrical roller bearings, double-row tapered roller bearings and self-aligning roller bearings.

By adopting such a double-row rolling bearing configuration, the bearing can be used in such a state that a preload is exerted to an internal portion of the bearing. As this occurs, in the event that the bearing is positioned properly, an axial movement of the rollers mounted on shafts can be reduced. Because of this, a belt can pass smoothly over the rollers, for example, as a result of which vibrations given to goods transported on the belt can be reduced. Thus, it is considered that the double-row configuration is effective in maintaining the quality of goods transported on the belt and reducing the generation of dust which is attributed to the goods transported on the belt.

Although the number of rolling elements is increased, by adopting the double-row rolling bearing configuration, since mass per a single rolling element can be reduced, a centrifugal force that would result from the revolution of the rolling elements is reduced. Thus, the double-row configuration provides a form suitable for rolling element revolutions at faster speeds.

In addition, by exerting a preload thereon, the axial movement of the seal portions is reduced, whereby the seal lip portions can be brought into sliding contact with the slinger in a stable fashion. Because of this, in addition to the original low-torque performance, a superior torque stability and dust-proof performance can be obtained.

(Fifth Embodiment)

Figure 13:
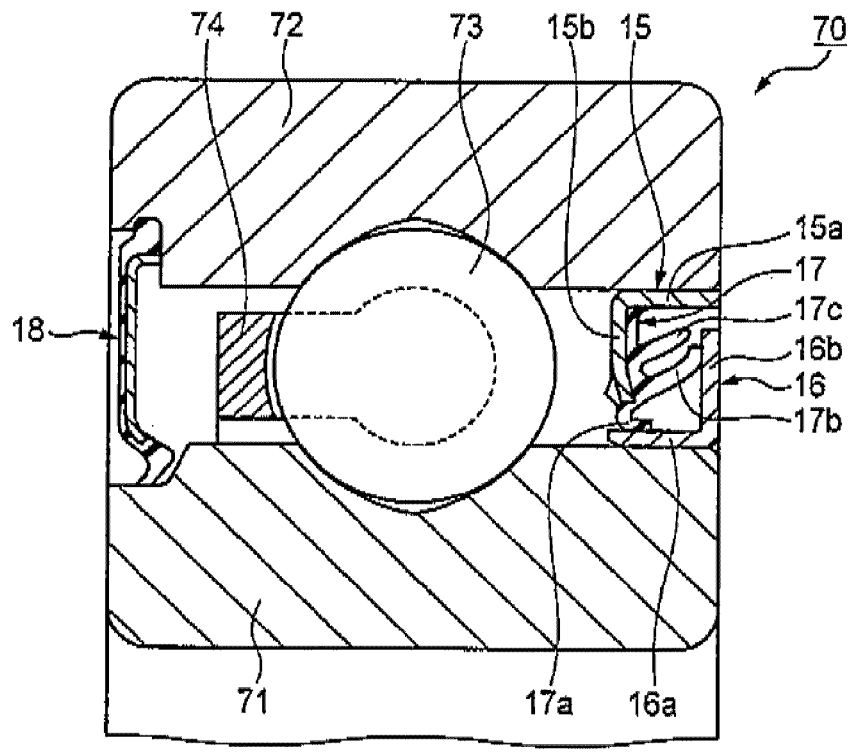
FIG. 13 is an axial sectional view for explaining a fifth embodiment of a conveyor bearing according to the invention.

FIG. 13 is an axial sectional view showing a conveyor bearing of a fifth embodiment. In the figure, like reference numerals will be given to portions which are like or similar to those of the first embodiment, and the description thereof will be omitted or simplified.

This embodiment is such that a multi-point contact ball bearing is adopted as the type of a bearing in the first to fourth embodiments. Namely, similar features to those of the first to third embodiments can be applied to this embodiment except that the type of a bearing is the multi-point contact ball bearing. In addition, even with a single-row multi-point contact ball bearing, since an axial movement is reduced, an advantage can be obtained which is similar to the preloaded double-row rolling bearing, As shown in FIG. 13, a multi-point contact ball bearing 70 is a four-point contact ball bearing which includes an inner ring 71, an outer ring 72, a plurality of balls (rolling elements) 73 and a cage 74. A resin cage is used for the cage 74, whereby an increase in rotating torque by the sliding contact of the balls 73 with the cage 74 can be reduced.

In addition to the four-point contact ball bearing shown in FIG. 13 in which the balls are brought into contact with the inner ring and the outer ring at two points on each of the inner and outer rings, multi-point contact ball bearings to which the invention can be applied a three-point contact ball bearing in which balls are brought into contact with an inner ring and an outer ring at one point on the inner ring and two points on the outer ring or at two points on the inner ring and one point on the outer ring and further a multi-point contact ball bearing in which balls are brought into contact with an inner ring and an outer ring at five or more points thereon.

A ball bearing in which at least one of an inner ring 71 and an outer ring 72 is divided in an axial direction can be used to configure the multi-point contact ball bearings above in which the balls are brought into contact with the inner ring and the outer ring at three points, four points and five or more points on the inner and outer rings.

(Sixth Embodiment)

Figure 14:
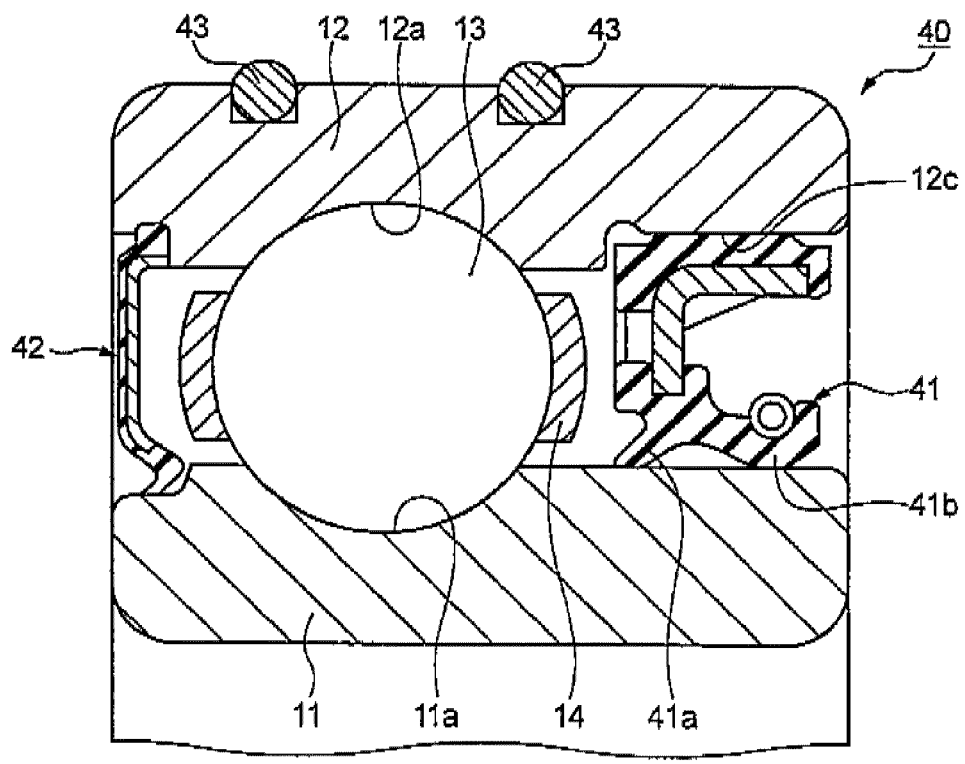
FIG. 14 is an axial sectional view for explaining a sixth embodiment of a conveyor bearing according to the invention.

FIG. 14 is an axial sectional view showing a conveyor bearing of a sixth embodiment.

This embodiment is characterized in that in the first to fifth embodiments, an elastic member is interposed at least either between a radially outer portion of an outer ring of a bearing and a housing or between a radially inner portion of an inner ring of the bearing and a shaft. In this embodiment, as a representative example of the type of rolling bearings described above, an example will be illustrated in which an O ring is mounted on the radially outer portion of the outer ring. This embodiment will be described based on the conveyor bearing 40 of the third embodiment.

As shown in FIG. 14, in a conveyor bearing 40 of this embodiment, O rings 43, 43 are installed on a radially outer portion of an outer ring 12 so that the radially outer portion of the outer ring 12 is fitted in a housing through clearance fit. By doing so, any one or some of advantages can be obtained which include prevention of a creeping phenomenon of the bearing 40, mitigation of impact load applied to the bearing 40, insulation of a roller from a shaft and the like.

Figure 15:
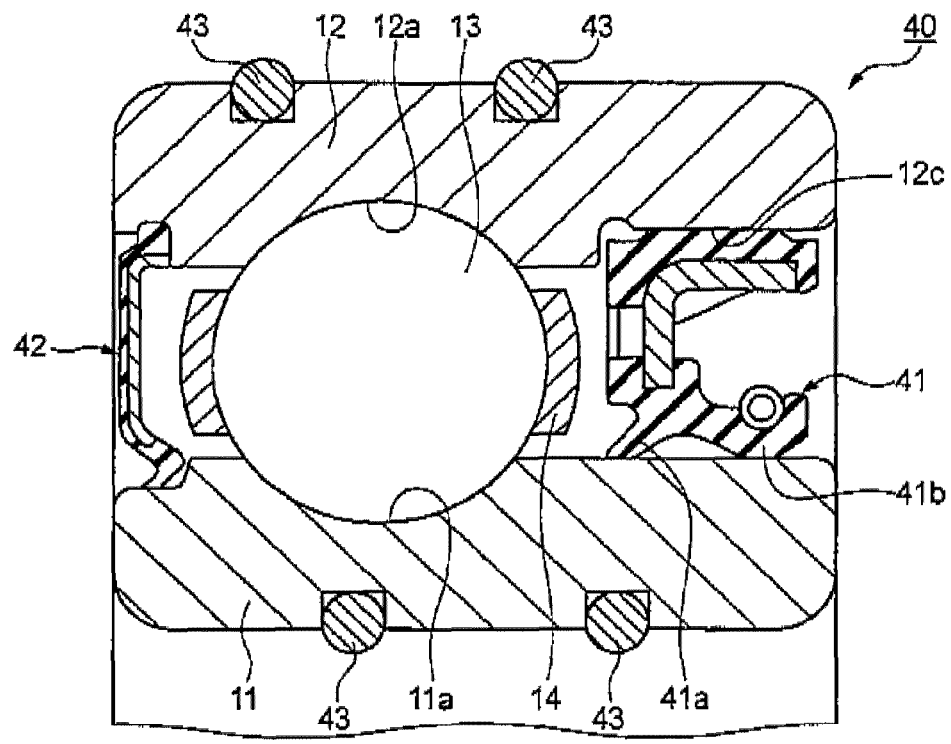
FIG. 15 is an axial sectional view for explaining another example of a conveyor bearing of the sixth embodiment.

FIG. 15 shows another example of a conveyor bearing of the sixth embodiment. In this example, in addition to a radially outer portion of an outer ring 12, O rings 43, 43 are installed on a radially inner portion of an inner ring 11.

With the O rings 43, 43 installed, the bearing can be fabricated through press fit in the event that the fitment of the radially outer portion of the outer ring 12 of the bearing into the housing and the fitment of the radially inner portion of the inner ring 11 of the bearing on the shaft are effected through interference fit. Since the seal devices (the seal-in devices) of the respective embodiments of the invention have the superior sealing performance, there is almost no problem with muddy water which attempts to pass through the internal portion of the bearing. However, there may be a risk that muddy water or the like intrudes into the internal portion of the roller between the bearing and the shaft and between the bearing and the housing. As this occurs, with the seal device (the seal-in device) at the opposite side of the bearing being of a non-contact type, muddy water is allowed to intrude into the internal portion of the bearing.

Although muddy water that passes between the bearing and the shaft and the bearing and the housing may intrude into the internal portion of the bearing even in the event that the fitment of the bearing in the housing and fitment of the bearing on the shaft are effected through press fit, by installing the O ring on at least either of the radially outer portion of the outer ring and the radially inner portion of the inner ring and effecting the fitment of the bearing in the housing and on the shaft through press fit, muddy water attempting to pass through the gap between the bearing and the housing can be prevented effectively. Preferably, it is effective that O rings are installed at the fitting portions where the inner ring and the outer ring are fitted on the shaft and in the housing, respectively, and the inner ring and the outer ring are so fitted through press fit.

While this embodiment has been described based on the O rings, in the event that elements are used which can exhibit the same advantage as that of the O rings, the form of the part of the bearing which involves the O rings can be altered. For example, the application of an adhesive which is slightly elastic to the fitting portions can be raised, for example.

(Other embodiments)

Next, referring to FIGS. 16 to 26, other embodiments of conveyor bearings according to the invention will be described. Like reference numerals will be given to portions which are substantially the same or the same as those described in the first to sixth embodiments, and the description thereof will be omitted or simplified.

Figure 16:
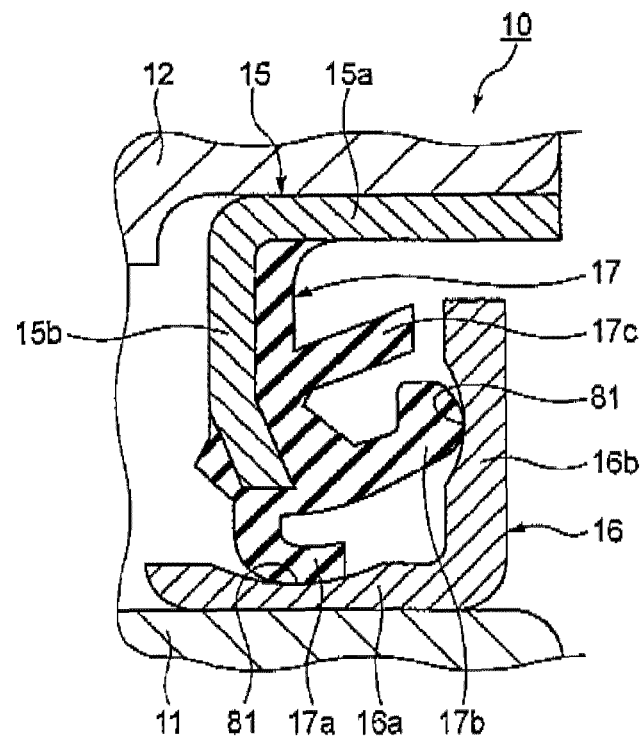
FIG. 16 is an enlarged sectional view of a main part for explaining another embodiment of a conveyor bearing according to the invention.

A conveyor bearing 10 in FIG. 16 adopts a form in which concavely curved surfaces 81 are formed on an outer circumferential surface of a cylindrical portion 16a and an internal surface of a circular disc portion 16b which constitute sliding contact surfaces of a slinger (a small-diameter L-shaped annular member) 16. By forming the concavely curved surfaces 81 on the sliding contact surfaces of the slinger 16, contact lengths of sliding contact portions of lip portions 17*a*, 17*b* can be secured long, which is effective in preventing the intrusion of muddy water or the like. In addition, in the event that a seal of this configuration is installed at one side of the bearing, with a non-contact seal installed at an opposite side thereof, it is possible to exert a light preload on the bearing in advance. It is also possible to change the magnitude of the preload depending on the configuration of the lips and the configuration of the slinger. Because of this, there can be expected advantages that fretting damage can be prevented from being made to raceway surfaces of the bearing rings by vibrations generated during transport and the number of man-hours can be reduced which are involves in positioning work carried out when assembling a bearing in a roller.

Figure 17:
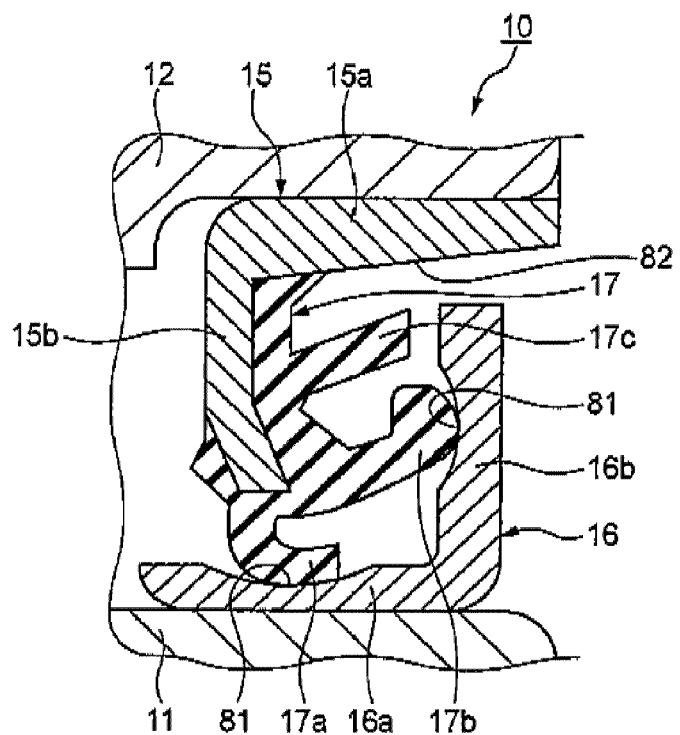
FIG. 17 is an enlarged sectional view of a main part for explaining a further embodiment of a conveyor bearing according to the invention.

A conveyor bearing 10 in FIG. 17 adopts a form in which a sloping portion 82 is formed on a fitting portion where a large-diameter L-shaped annular member 15 is fitted in a bore side of an outer ring 12, that is, an inner circumferential surface of a cylindrical portion 15*a*. By this configuration, advantages can be expected that the attachment at the fitting portion is stabilized and that the discharge of muddy water or the like which sticks to a seal lip 17 is facilitated by rotation of an outer ring.

Figure 18:
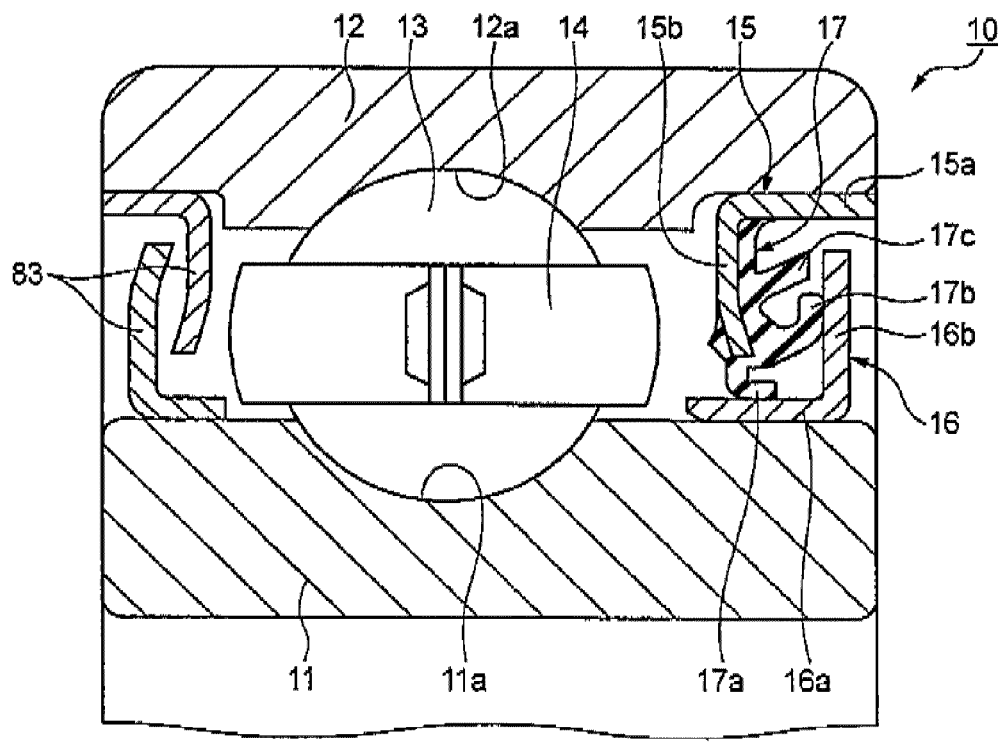
FIG. 18 is an axial sectional view for explaining another embodiment of a conveyor bearing according to the invention.

A conveyor bearing 10 in FIG. 18 adopts a form in which two slingers 83, 83 are mounted in an opening at a roller center side of the bearing 10 so as to configure a non-contact labyrinth seal. Since this simplifies the seal at the one side of the bearing 10, not only can a widthwise dimension of the bearing be reduced, but also a superior dustproofness performance can be provided.

Figure 19:
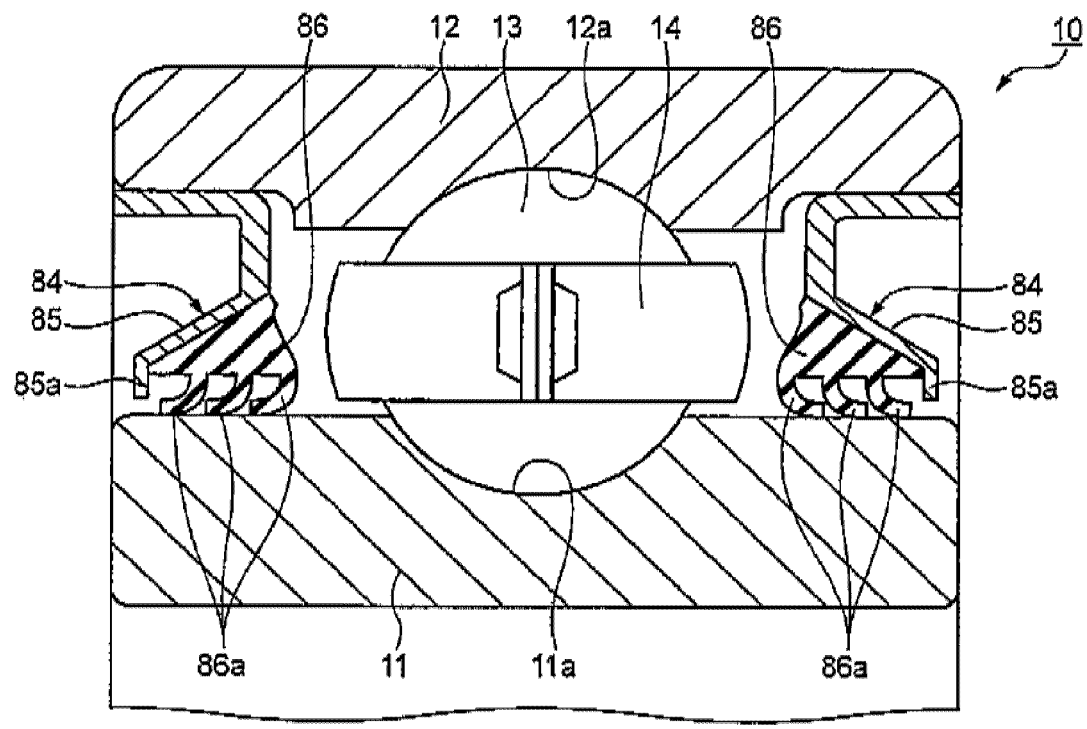
FIG. 19 is an axial sectional view for explaining a further embodiment of a conveyor bearing according to the invention.

A conveyor bearing 10 shown in FIG. 19 adopts a form in which seal devices 84 are provided on inner circumferential surfaces of both axial end portions of an outer ring 12. This seal device 84 includes a shield plate 85 having a substantially trapezoidal section which is fixed to the inner circumferential surface of the axial end portion of the outer ring 12 and a seal 86 which is secured to an inner circumferential surface of the shield plate 85. A non-contact shield 85*a* is formed at an inner circumferential end portion of the shield plate 85, and three contact lips 86*a*, 86*a*, 86*a* are formed on an inner circumferential surface of the seal 86 at substantially equal intervals. In this case, the intrusion of muddy water can effectively be prevented by the non-contact shield 85*a* and the three contact lips 86*a*, 86*a*, 86*a*. In addition, since the number of components is small, the fabrication costs can be reduced.

Figure 20:
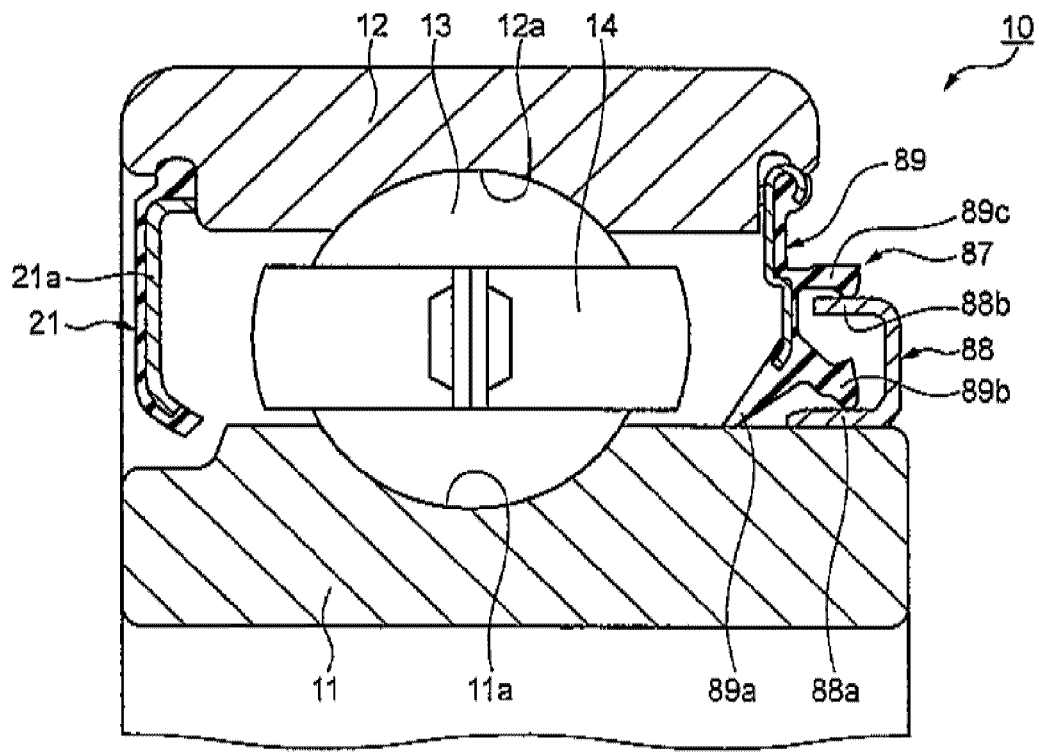
FIG. 20 is an axial sectional view for explaining another embodiment of a conveyor bearing according to the invention.

A conveyor bearing 10 in FIG. 20 adopts a form in which a seal device 87 is provided in an opening portion at a side which lies farther away from a roller center side of the bearing 10. This seal device 87 includes a slinger 88 having a substantially U-shaped section which is fixed to an outer circumferential surface of an axial end portion of an inner ring 11 and a seal member 89 which is fixed to an inner circumferential surface of an axial end portion of an outer ring 12 and which is brought into contact with the slinger 88 and the inner ring 11. The seal member 89 has a contact lip 89*a* which is brought into contact with an outer circumferential surface of the inner ring 11, a contact lip 89*b* which is brought into contact with an outer circumferential surface of an inner circumferential cylindrical portion 88*a* of the slinger 88 and a contact lip 89*c* which is brought into contact with an outer circumferential surface of an outer circumferential cylindrical portion 88*b* of the slinger 88.

Figure 21:
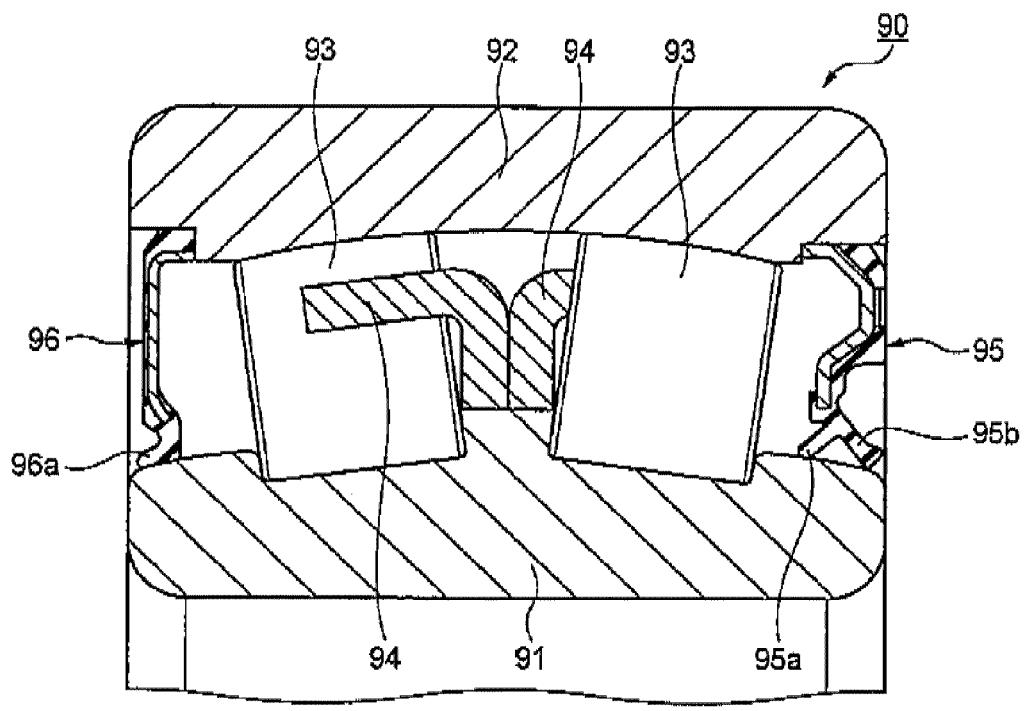
FIG. 21 is an axial sectional view for explaining a further embodiment of a conveyor bearing according to the invention.

A conveyor bearing 90 in FIG. 21 adopts a form in which the invention is applied to a self aligning roller bearing. This conveyor bearing 90 includes an inner ring 91, an outer ring 92, a plurality of rollers 93, 93 and cases 94, 94. A seal member 95 is fixed to an inner circumferential surface of an axial end portion of the outer ring 92, and a seal member 96 is fixed to an inner circumferential surface of the other axial end portion of the outer ring 92. Two contact lips 95*a*, 95*b* are formed at an inner circumferential end portion of the seal member so as to be brought into contact with an outer circumferential surface of the inner ring 91. A contact lip 96*a* is formed at an inner circumferential end portion of the seal member 96 so as to be brought into contact with the outer circumferential surface of the inner ring 91.

Figure 22:
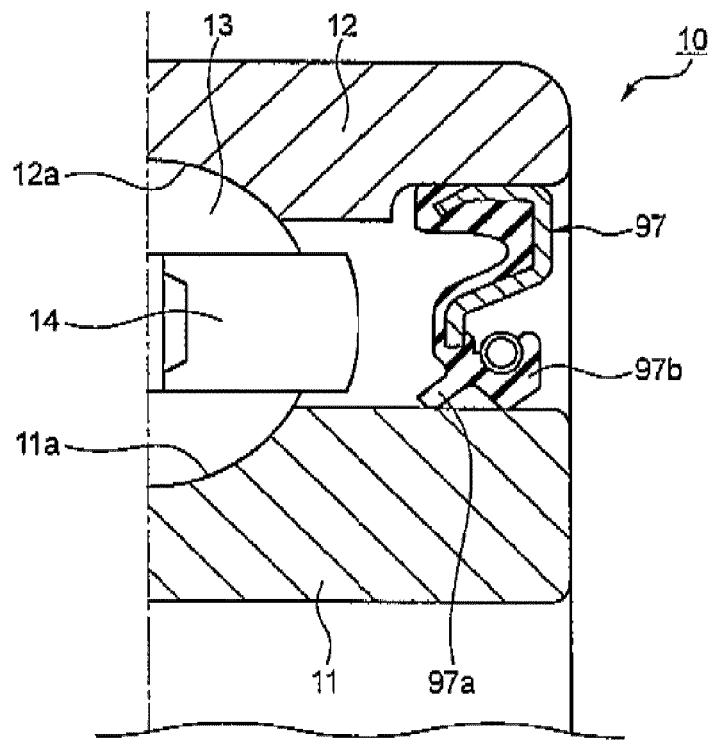
FIG. 22 is an axial sectional view for explaining another embodiment of a conveyor bearing according to the invention.

A conveyor bearing 10 in FIG. 22 adopts a form in which a seal member 97 is provided in an opening portion at a side of the bearing 10 which lies farther from a center of a roller. This seal member 97 is fixed to an inner circumferential surface of an axial end portion of an outer ring 12, and two lips 97*a*, 97*b* are formed at an inner circumferential end portion thereof so as to be brought into contact with an outer circumferential surface of an inner ring 11.

Figure 23:
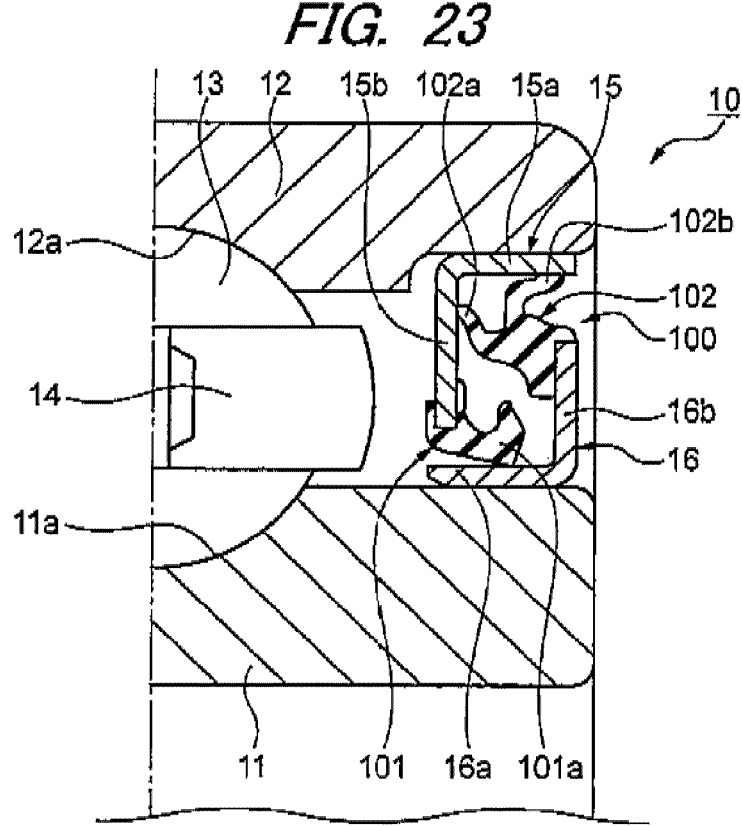
FIG. 23 is an axial sectional view for explaining a further embodiment of a conveyor bearing according to the invention.

A conveyor bearing 10 in FIG. 23 adopts a form in which a seal device 100 is provided in an opening portion at a side of the bearing 10 which lies farther from a center of a roller. This seal device 100 includes a large-diameter L-shaped annular member 15 which is fixed to an axial end portion of an outer ring 12, a small-diameter L-shaped annular member 16 which is fixed to an outer circumferential surface of an axial end portion of an inner ring 1), a seal 101 which is secured to an inner circumferential end portion of a circular disc portion 15*b* of the large-diameter L-shaped annular member 15 and a seal 102 which is secured to an outer circumferential end portion of a circular disc portion 16*b* of the small-diameter L-shaped annular member 16. The seal 101 has a contact lip 101*a* formed so as to be brought into contact with an outer circumferential surface of a cylindrical portion 16*a* of the small-diameter L-shaped annular member 16. The seal 102 has a contact lip 102*a* formed so as to be brought into contact with an external surface of the circular disc portion 15*b* of the large-diameter L-shaped annular member 15 and a contact lip 102*b* formed so as to be brought into an inner circumferential surface of a cylindrical portion 15*a* of the large-diameter L-shaped annular member 15.

Figure 24:
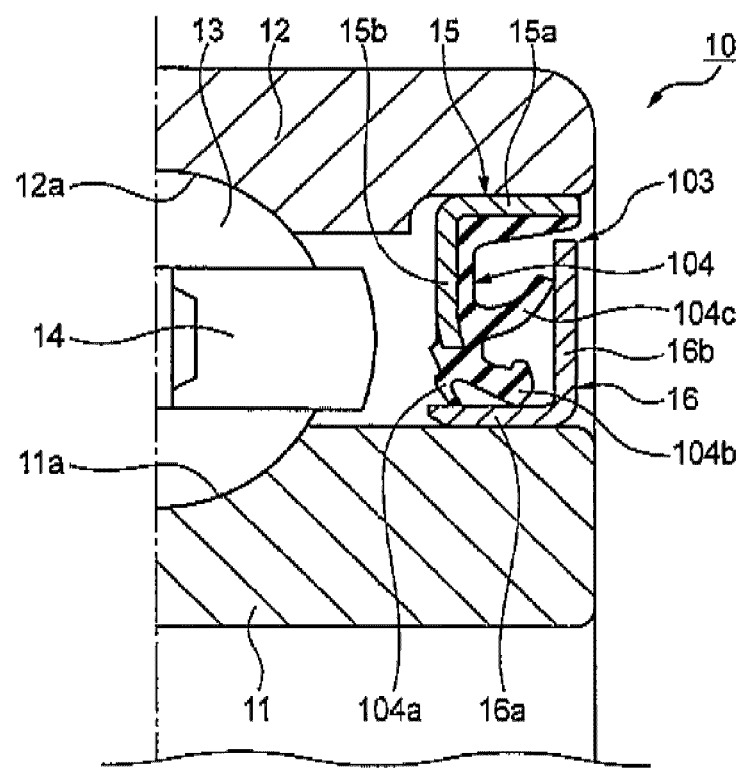
FIG. 24 is an axial sectional view for explaining another embodiment of a conveyor bearing according to the invention.

A conveyor bearing 10 in FIG. 24 adopts a form in which a seal device 103 is provided in an opening portion at a side of the bearing 10 which lies farther from a center of a roller. This seal device 103 includes a large-diameter L-shaped annular member 15 which is fixed to an inner circumferential surface of an axial end portion of an outer ring 12, a small-diameter L-shaped annular member 16 which is fixed to an outer circumferential surface of an axial end portion of an inner ring 11 and a seal 104 which is secured to an external surface of the large-diameter L-shaped annular member 15. The seal 104 has two contact lips 104*a*, 104*b* formed so as to be brought into contact with an outer circumferential surface of a cylindrical portion 16*a* of the small-diameter L-shaped annular member 16 and one contact lip 104*c* formed so as to be brought into contact with an internal surface of a circular disc portion 16*b* of the small-diameter L-shaped annular member 16.

Figure 25:
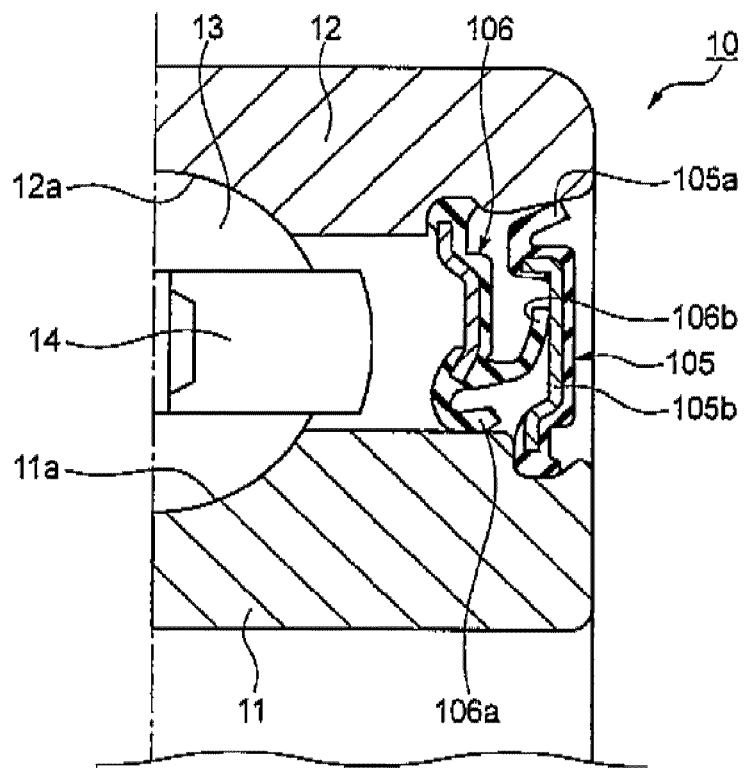
FIG. 25 is an axial sectional view for explaining a further embodiment of a conveyor bearing according to the invention.

A conveyor bearing 10 in FIG. 25 adopts a form in which two seal members 105, 106 are provided in an opening portion at a side of the bearing 10 which lies farther from a center of a roller. The seal member 105 is fixed to an outer circumferential surface of an axial end portion of an inner ring and has a contact lip 105*a* formed at an external end portion thereof so as to be brought into contact with an inner circumferential surface of an outer ring 12. The seal member 106 is fixed to an inner circumferential surface of an axial end portion of the outer ring 12 in a position lying further inwards than the seal member 105 and has a contact lip 106a formed so as to be brought into contact with the outer circumferential surface of an inner ring 11 and a contact lip 106b formed so as to be brought into contact with an internal surface of a core metal 105b of the seal member 105.

Figure 26:
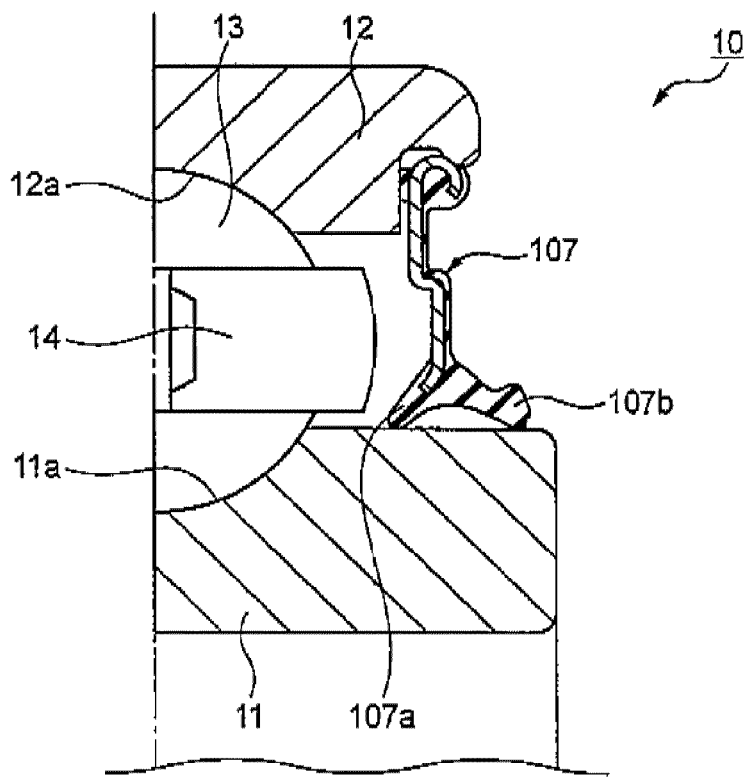
FIG. 26 is an axial sectional view for explaining another embodiment of a conveyor bearing according to the invention.

A conveyor bearing 10 in FIG. 26 adopts a form in which a seal member 107 is provided in an opening portion at a side of the bearing 10 which lies farther from a center of a roller. This seal member 107 is fixed to an inner circumferential surface of an axial end portion of an outer ring 12 and has two contact lips 107a, 107b formed so as to be brought into contact with an outer circumferential surface of an inner ring 11.

In the conveyor bearings 10 in FIGS. 22 to 26, a contact or non-contact rubber seal, a non-contact metallic seal and a labyrinth structure can be adopted for a seal-in device which is provided at an opposite axial end portion which is not shown. Alternatively, as in the illustrated examples, it may be a seal device having two or more lips that is provided in the opening portion in question.

In the respective embodiments, widths of the inner and outer rings are made to differ, and additionally, thicknesses of the inner and outer rings are also made to differ. For example, the invention can be applied to a form in which the thickness of the outer ring is made thick, while the thickness of the inner ring is made thin.

EXAMPLE 1

Next, using an idler roller (an example of the invention) which includes the conveyor bearing 10 of the invention shown in FIG. 3 and the conventional idler roller (a conventional example) shown in FIG. 6, rotating torque tests and water intrusion tests were carried out to compare the respective performances of the two idler rollers.

The sizes of the roller of the example of the invention and the roller of the conventional example and the dimensions of the bearings used in the respective rollers were made the same. A bore diameter and an outside diameter of the bearings are 40 mm and 90 mm, respectively. As a lubricant, a grease was sealed in an internal portion of the bearings to 50% of a space volume thereof. The grease is a synthetic hydrocarbon oil (base oil viscosity is 200 mm$^2$/s:40° C.) and uses diurea as a thickener.

The grease was applied in a small amount to the contact lips 19a, 19b of the conveyor bearing 10 of the invention. In addition, the grease was sealed in the conventional idler roller to 50% of the space volume between the cap and the bearing. In addition, two bearings are used in each of the idler rollers.

As a test method, a radial load of 9.8 kN was exerted on the idler rollers. The shafts were fixed so that the outer ring rotates. The roller portions were rotated at 100 rpm for 24 hours in the room temperature atmosphere. The rotating torque of the idler rollers was measured after they had been operated for 24 hours.

In addition, after the rotating torque was measured, the idler rollers were rotated under the aforesaid conditions at the same room temperature and water spray. Thereafter, the water contents of the grease remaining in the internal portions of the bearings were measured.

As a result of the tests, the followings were found out. The rotating torque was reduced by on the order of 40% in the example of the invention, compared with the conventional example. As to water intrusion into the bearings, the water intrusion was reduced by 95% or more in the example of the invention, compared with the conventional example.

Hereinafter, preferred forms common to the respective embodiments of the invention will be described.

(Lubrication and Lubricant)

It is preferable that the bearing is lubricated by a grease composition sealed in the internal portion of the bearing. However, it is possible to lubricate the bearing by various lubrication methods including oil bath lubrication, oil mist lubrication, oil air lubrication, lubrication with a solid lubricant and lubrication with oil containing resin or oil containing felt.

As lubrication grease, it is possible to use one which is produced by adding, in a base oil such as mineral oil, animal or vegetable oil or synthetic oil, metallic soap or metal composite soap, organic matters such as urea compound or terephtalamate, organic polymer powder such as fluorine plastic or polyethylene, inorganic powder such as mineral, clay or metallic oxide, or a mixture thereof as a thickener with anticorrosion agent, anti-oxidizing agent and additive such as high-pressure additive which are added as required.

Among them, a grease composition is preferable which is produced using a urea compound as a thickener and a synthetic hydrocarbon oil as a base oil. With the grease composition composed of the constituent materials described above, a superior resistance to water is exhibited when water is mixed therewith, and the degree is small at which the grease composition is softened by stirring shearing resulting from rotation of the bearing or the grease composition is softened by vibration of the bearing. In addition, oil separation from the grease composition is appropriate and a superior resistance to high temperature is exhibited. Therefore, the life of the bearing and hence the life of the conveyor roller can be extended.

Not only the seals installed in the bearing but also the conveyor belt which is held by the conveyor rollers generally use a synthetic rubber as one of main constituents thereof. The synthetic hydrocarbon oil has small chemical attack properties to synthetic rubber. Because of this, should the grease leak from the internal portion of the bearing to thereby stick to the conveyor belt, the conveyor belt is only affected very little.

In addition, the urea based thickener is also chemically stable substance and its chemical attack properties to synthetic rubber are extremely small, which is preferable.

As synthetic hydrocarbon oil, there can be raised poly-α-olefin, ethylene-propylene oligomer, alkyl benzene and alkyl naphthalene. Among them, poly-α-olefin is preferable since it has small chemical attack properties, good heat resistance and low pour point.

As the urea compound of the thickener, diurea, triurea or tetraurea, or polyurea having a higher polymerization degree than tetraurea, or a mixture thereof can be used. Among them, a diurea compound is preferably used. With a grease composition including a diurea compound as a thickener, the grease properties change little when water intrudes to be mixed therewith. The grease containing the diurea compound exhibits superior heat resistance and shear stability, is difficult to be hardened even at low temperatures and can hold a suitable oil repellency.

Among diurea compounds, a diurea compound is preferable which is expressed by Formula 1 below.

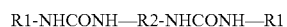

R1-NHCONH—R2-NHCONH—R1     (Formula 1)

R1s at both ends of the expression may be the same or different from each other and is a hydrocarbon group whose carbon number is in the range of 6 to 18. Preferable are an alkyl group whose carbon number is in the range of 8 to 18, an alicyclic group whose carbon number is in the range of 6 to 12 and an aromatic group whose carbon number is in the range of 6 to 18 carbons. R2 is an aromatic group whose carbon number is in the range of 6 to 15 carbons.

When the belt conveyor is used in the normal environment temperature (−40 to 50° C.) atmosphere, it is preferable to use a thickener in which the alkyl group whose carbon number is in the range of 8 to 18 or the alicyclic group whose carbon number is in the range of 6 to 12 is used as R1. With the thickener composed of either of these groups, the grease can have a suitable shear stability at the environment temperatures and enable low torque rotation without interrupting the rotation of the bearing.

A ratio of the thickener contained in the grease composition to the total amount of the grease composition is preferably in the range of 5 to 35 mass percent. In the event that the ratio of the thickener is less that 5 mass percent, the intimate mixing consistency of the grease composition is increased, and this makes the grease composition have an excessive fluidity, thereby causing the grease to flow out of the bearing in a large amount. On the contrary, in the event that the ratio exceeds 35 mass percent, the intimate mixing consistency of the grease composition becomes too low, and in the event that the grease is sealed in the bearing, the rotating torque tends to become too large.

With a grease composition in which the preferred diurea compound using the alkyl group whose carbon number is in the range of 8 to 18 or the alicyclic group whose carbon number is in the range of 6 to 12 is used as a thickener in the poly-α-olefin base oil, a preferable amount in mass percent of the thickener is in the range of 10 to 20 mass percent relative to the total amount of the grease composition. When expressed in intimate mixing consistency value, the preferable amount of the thickener is preferably in the range of 200 to 350. A more preferable amount in mass of the thickener relative to the total amount of the grease composition is in the range of 12 to 18 mass percent, and when it is expressed in the intimating mixing consistency value, the more preferable amount is in the range of 220 to 300.

The viscosity of the base oil of the grease is preferably in the range of 10 to 1500 mm$^2$/s at 40° C. In the event that the viscosity is less than 10 mm2/s, evaporation while in use is increased, and heat resistance is deteriorated. In the even that the viscosity exceeds 1500 mm2/s, the shear resistance of the base oil itself becomes large, this calling for an increase in rotating torque of the bearing. In addition, since heat is generated in association with shearing, such an excessive viscosity is disadvantageous in durability.

It is preferable that the viscosity is in the range of 20 to 500 mm$^2$/s, and any suitable viscosity is preferably selected from this range depending on conditions under which the bearing is used. Normally, when the bearing is used in an environment temperature (−40 to 60°) atmosphere, it is preferable that the viscosity is in the range of 30 to 400 mm$^2$/s at 40° C. When the bearing is used at a lower temperature area of the normal operating environment temperatures in many cases or is used at lower temperatures than the normal operating environment temperatures, it is preferable that the viscosity is in the range of 20 to 300 mm$^2$/s at 40° C. On the contrary, when the bearing is used at a higher temperature area of the normal operating environment temperatures in many cases or is used at higher temperatures than the normal operating environment temperatures, it is preferable that the viscosity is in the range of 40 to 500 mm$^2$/s at 40° C. In the normal operating environment temperatures (−40 to 60°), it is more preferable that the viscosity is in the range of 40 to 300 mm$^2$/s at 40° C. It is most preferable that the viscosity is in the range of 100 to 300 mm$^2$/s at 40° C.

In the event that the bearing temperature is affected by heat transmitted thereto due to the temperature of products transported by the conveyor being relatively high or low, the viscosity of the base oil is preferably controlled in consideration of the temperature of the products transported by the conveyor.

It is preferable that at least an anti-oxidizing agent and an anticorrosion agent are added to the grease composition. As the anti-oxidizing agent, various types of anti-oxidizing agents can be used including amine-based and phenol-based anti-oxidizing agents. As the anticorrosion agent, a metal salt such as sulfonate can be used preferably.

In the event that conductive properties are given to the grease composition, it is preferable that a conductive properties imparting agent such as carbon black or carbon nanotube is added in several percent to several tens percent the total amount of grease composition.

It is also possible to use an incombustible grease using an incombustible oil such as phosphate as a base oil or a biodegradable grease using a vegetable oil or an ester oil as a base oil.

A seal amount of the grease composition in the internal portion of the bearing is preferably 10 to 100% of the space volume of the bearing. In the event that the seal amount is less than 10%, it is difficult for the grease composition to be sent to portions in the bearing where lubrication is needed. In addition, in the event that water intrudes, the relative ratio of water within the bearing increases, and a lubrication failure tends to occur easily within the bearing. It is more preferable that the seal amount is in the range of 20 to 80%. In the event that the seal amount exceeds 80%, the stirring resistance generated when the grease is stirred in the internal portion of the bearing by rotation of the bearing increases, and this may cause an increase in the rotating torque of the bearing. It is most preferable that the seal amount is in the range of 20 to 70%. In the event that the seal amount stays within this range, a good balance can be obtained between the rotating torque of the bearing and other needed performances thereof.

A suitable seal amount may change depending on the revolution speed of the convey roller. In the event that the bearing is used mainly at relatively high speeds (a dmn value exceeds 100,000 which is expressed by (([Bearing outside diameter+ Bearing bore diameter dimension]/2)×revolution speed), it is preferable that the seal amount of the grease composition is 20 to 50% the total amount of the grease composition. In the event that the seal amount stays in that range, since heat generation is relatively small which results from grease being stirred or sheared by the bearing rotating at high speeds, the bearing can enjoy a long life. On the contrary, in the event that the bearing is mainly used at low speeds where the dmn value is 100,000 or less, since the bearing is affected little by the grease stirred when the bearing rotates, it is preferable that the seal amount of the grease composition is in the range of 40 to 70%.

(Materials of Inner and Outer Rings and Rolling Element)

There is no specific limitation imposed on the quality of materials which make up inner and outer rings, rolling elements and cages of rolling bearings, and hence metals, inorganic materials and organic materials can be used. However, the following are preferable.

Metallic materials represented by seal products, ceramics and resin materials can be used for inner and outer rings of rolling bearings. Metallic materials are classified into so-called ferrous steel produces and nonferrous alloys, and both iron-based steel products and nonferrous alloys can be used.

The following steel products can be used which include bearing steels such as SUJ1, SUJ2, SUJ3 and SUJ4, stainless steels such as martensitic stainless steels, austenitic stainless steels and precipitation hardening stainless steels which include SUS303, SUS304, SUS316, SUS420J2, SUS430, SUS440C, SUS630 and 515440C, heat resistant steels and high speed steels such as M50, V50 and SKH4 and case hardening steels such as S53C, SCr420, SCN420H and SNCM220H.

These ferrous steel products are normally subjected to hardening treatments such as quenching, carburizing, carbo-nitriding, sulphurizing and nitrosulphurizing for use. In addition, after these hardening treatments, tempering and low-temperature treatments are applied to those hardened steel products as required so that the steel products are treated to obtain predetermined hardnesses for use (hereinafter, the series of treatments will be referred to as heat treatment).

Preferably, it is superior in cost performance in fabricating inner and outer rings and rolling elements that a bearing steel (SUJ1 to 3) is heat treated so that the hardness of a raceway surface becomes HRC58 to 66 for use. It is more preferable that the bearing steel is heat treated so as to realize a hardness of HRC60 to 64. Further, it is preferable that the hardness of the rolling elements is harder 1 to 2 in HRc value than the hardness of the raceway surfaces of the inner and outer rings in the range of HRC58 to 66.

As has been described, water easily intrudes into the conveyor bearing. Namely, there are possibilities that hard foreign matters such as mud and sand enter the bearing together with water to thereby be mixed with grease. In the event that foreign matters such as mud and sand enter the bearing and are then bitten between the raceway surfaces and the rolling elements to thereby damage the raceway surfaces, with the hardnesses of the raceway surfaces and the rolling elements being the same, damage tends to be concentrated on the rolling elements, reducing the life thereof in many cases.

With a difference in hardness provided between the raceway surfaces and the rolling elements, the concentration of damage on the rolling elements can be prevented, resulting in a longer life.

Further, in the event of SUJ2 being used, it is preferable to apply the carbo-nitriding treatment to both the inner and outer rings and the rolling elements or only to the rolling elements. The carbon contents and the nitrogen contents of the surface of the rolling element and the raceway surface are increased by applying the carbo-nitriding treatment. Because of this, the solid-solution strengthening and hardening function by carbon and nitrogen and the resistance to temper softening by nitrogen can be imparted. Because of this, even with a high tempering temperature, a hardness of HRC58 or more can be obtained. Normally, permanent deformation tends to occur in a heat treated steel product when the temperature surpasses its tempering temperature. Namely, since the dimension stability can be maintained to higher temperatures with a high tempering temperature, the carbo-nitriding treatment is preferable for various applications including the application to the conveyor.

In the event that the carbo-nitriding treatment is applied to raceway surfaces of inner and outer rings of a conveyor rolling bearing, it is preferable from the viewpoint of cost performance that a carbo-nitriding treatment is applied only to rolling elements, while a normal heat treatment is applied to the inner and outer rings so that the hardness of the rolling elements is made higher 1 to 2 in HRC than that of the inner and outer rings.

Various types of case hardening steels, stainless steels, and martensitic stainless steels such as high carbon chromium bearing steels SUJ1, SUJ3, SUJ4 excluding SUJ2 which is high carbon chromium bearing steel may be used for inner and outer rings and rolling elements, and a carbo-nitriding treatment is applied to the steels so that the hardness of the rolling elements becomes higher 1 to 2 in HRC than that of the inner and outer rings. In addition, the hardness of the rolling elements may be made higher 1 to 2 in HRC than that of the inner and outer rings by combining the kinds of steels or with or without application of the carbo-nitriding treatment. Further, a combination of a stainless steel and SUJ2 can also be adopted for inner and outer rings which tend to be subjected to muddy water to rust, the stainless steel being used for the inner and outer rings, the SUJ2 being used for the rolling elements inside the bearing.

It is also possible to reduce the influences of surface damage made by foreign matters that have intruded into the bearing by reducing minutely particle diameters of carbides and nitrides in the surface by controlling the amount of residual austenite when the carbo-nitriding treatment is applied.

Further, as other materials than SUJ2, a steel product can be used which contains 2 to 12% Cr constituent to thereby effectively prevent brittleness by hydrogen which intrudes into the steel.

As inorganic materials, various types of ceramics can be used for inner and outer rings and rolling elements. Silicone nitride, alumina and zirconia can preferably be used. Normally, ceramics are sintered products. An additive such as a sintered additive is added into the main constituents described above, and a ceramic so prepared is then pressed to be sintered by an HIP press. Thereafter, the sintered ceramic is cut to a predetermined size and is machined to a predetermined surface roughness through abrasive machining. Silicone nitride is preferably used. Among various types of ceramics, silicone nitride is superior in toughness and can preferably be used for rolling bearings.

Although it is possible to both inner and outer rings and rolling elements are made of ceramic, the costs are very high. A form provides a superior cost performance in which inner and outer rings are made of a steel product, while rolling elements are made of a ceramic. Normally, ceramics are insulating materials, and therefore, by making all the rolling elements of a ceramic, the inner and outer rings can be electrically isolated. In addition, normally, ceramics are very hart, and therefore, in the event that the rolling elements are made of a ceramic, it is preferable that a steel product to which a carbo-nitriding treatment has been applied is used for the inner and outer rings. Further, in the event that the rolling elements are made of a ceramic and the inner and outer rings of a stainless steel, a bearing having a superior anticorrosion performance can be fabricated with good cost performance.

As organic materials, various types of resin materials can be used for inner and outer rings and rolling elements. Among resin materials, various types of thermosetting resin materials and thermoplastic resin materials can preferably be used. Phenolic resins can be raised as thermosetting resins. Hydrocarbon resins and fluorine resins can be raised as thermosetting resins, the hydrocarbon resins including polyethylene, polypropylene, polyacetal, polyamide, polyimide, polyamide-imide, polyphenylene sulfide, polyether ether ketone, polycarbonate and amyl, the fluorine resins including polytetrafuluoroethylene, and tetrafuluoroethylene-perfluorovinyl ether copolymer.

As non-ferrous materials, aluminum alloys, titanium alloys, magnesium alloys and copper alloys can be used. Among these non-ferrous materials, copper alloys (brass), titanium alloys or beryllium-copper alloys are preferable.

(Configuration and Material of Cage)

It is preferable that the rolling bearing of the invention has a cage for retaining rolling elements at predetermined intervals. However, it is possible to adopt a configuration in which no cage is provided or a full rolling element configuration. As machining forms of cages, a machined cage, a pressed cage and an injection molded cage are selected as required. As configurations of cages, various configurations can be used which include a crown type cage, a ribbon type cage, a double-split cage, a two-piece cage, a claw cage, a solid cage, a horn cage, a pin type cage and a ladder type cage. In addition, a form can be adopted in which in place of a cage, a holding member for retaining an inter-rolling element space is disposed between rolling elements.

As materials of cages, metals such as steels and resins are raised. As materials of synthetic resin cages, a resin material in which a synthetic resin such as nylon, polyimide, polyacetal, phenol, polypropylene, or polyphenylene sulfide is reinforced by glass fibers and a fluorine resin such as polytetrafluoroetylene are preferable, in particular, a resin material is preferable in which glass fibers are added in a base material of nylon resin (6-6 nylon) as a reinforcement material in terms of strength, resistance to wear and costs. As other reinforcement materials, carbon fibers, aramid fibers and various types of whiskers are raised. The contents of fibers are selected appropriately in consideration of moldability and assembling properties of cages in addition to strength thereof. Normally, the fiber contents is in the range of 5 to 40 wt %. As metallic materials, brass, iron (steel) and stainless steel can be used. Specifically, steel products such as SPCC and 25C, stainless steels such as SUS304 and brass are used. It is preferable to apply a surface treatment such as a nitriding treatment to metallic cages.

(Materials of Seal Member, Seal Lips and O-Rings)

As materials for elastic members which can be used as seal members, seal lips and O-rings, various types of synthetic resins, natural resins, synthetic rubbers and natural rubbers can be used. Preferably, synthetic rubbers are used. As synthetic rubbers, synthetic rubbers specified under JIS K6397 can be used which include ACM, AEM, ANM, CM, CSM, EPDM, EPM,EVM, FEPM, FFKM, FKM, IM, NBM, SEBM, SEPM, CO, ECO, GCO, GECO, GPO, ABR, BR, CR, ENR. HNBR, IIR, TR, MSBR, NBIR, NBR, NIR, NR, NOR, PBR, PS, BR, SBR, E-SBR, S-SBR, SIBR, XBR, XCR, XNBR, XSBR, BIIR, CIIR, FMQ, FVMQ, MQ, PMQ, PV, MQ, AFMU, AU, EU, OT, EOT, FZ and PZ. These can be used alone or in combination or can be used together with various types of additives and various type of fillers.

Among these synthetic rubbers, as seal materials, seal lip materials and O-ring materials, NBR (acrylonitrile butadiene rubber), HNBR (hydrogenated acrylonitrile butadiene rubber) and XNBR (carboxylated acrylonitrile butadiene rubber) are preferable which have superior heat resistance and oil resistance.

Further, for O-rings, a nitrile rubber is preferable which is NBR or NBR and whose acrylonitrile contents is 48 mass percent or less and 15 mass percent or more. A nitrile rubber is more preferable which is NBR and whose acrylonitrile contents is 41 mass percent or less and 25 mass percent or more. A nitrile rubber is most preferable which is NBR and whose acrylonitrile contents is 36 mass percent or less and 34 mass percent or more.

Furthermore, as seal materials and seal lip materials, a nitrile rubber is preferable which is NMR or HNBR and whose acrylonitrile contents is 48 mass percent or less and 15 mass percent or more. A nitrile rubber is more preferable which is NBR and whose acrylonitrile contents is 41 mass percent or less and 25 mass percent or more. A nitrile rubber is most preferable which is HNBR and whose acrylonitrile contents is 36 mass percent or less and 34 mass percent or more.

In the case of the invention, since the O-rings are fixed in use, NBR is preferable. The seals and seal lips slide in use and are used for sealing, HNBR is preferable. In the even that a nitrile rubber is used which is NBR or HNBR and whose acrylonitrile contents is 41 mass percent or less and 25 mass percent or more, superior heat resistance and durability can be provided.

Generally used techniques can be used without problem in joining these rubber and resin materials together or in joining these rubber and resin materials with metals. For example, in bonding together rubber and metal, vulcanization bonding or bonding using an adhesive can be applied.

As materials of slingers, core metals of seal portions and shield plates, various types of materials can be used which include the metallic materials, ceramics and resin materials which are illustrated in the outer and inner rings, rolling elements and cages. The metallic materials are preferably used.

Since the slinger is the portion which is exposed to the outside when the bearing is used in the conveyor roller, the anticorrosion performance is important and hence, stainless steels are used. Alternatively, a product is preferably used in which a surface treatment for anticorrosion is applied to an SPCC steel sheet. Metal coating treatments such as a water repellent and oil repellent treatment in which a water repellent and oil repellent agent is applied to the surface of the steel sheet, galvanizing, electrogalvanizing, electroless zinc plating and zinc shot, surface inactivation treatments such as blackening and passivation treatment, and a coating treatment using a paint such as a cation paint can be used. Further, although the costs are expensive, a surface hardening treatment is applied in parallel or a diamond-like carbon coating or ceramic spray coating can also be used as a surface treatment which has both a surface hardening function and an anticorrosion function.

Similar to the slingers, since the end face portions of the bearing are also portions exposed to the outside, it is possible to apply the same surface treatments as those applied to the slingers. In addition, as described above, since there may be a risk that muddy water intrudes into the fitting portions between the bearing and the shaft and between the bearing and the housing even through press fitting is effected thereat, it is preferable that the aforesaid coatings are also applied to not only the end faces of the bearings but also to the radially outer surface of the outer ring of the bearing, the radially inner surface of the inner ring of the bearing and the chamfered portions between those circumferential surfaces and the end faces of the bearing.

In carrying out the invention including the embodiments shown in FIGS. 1 to 5 and FIGS. 7 to 26, the axial center of the rolling element and the axial center (widthwise dimension) of the inner and outer rings of the rolling bearing may coincide with each other or may not. This is true with the radial centers thereof.

While the present invention hEs been described in detail with reference to specific embodiments thereof, it is apparent for those skilled in the art that various changes and modifications can be made therein without departing from the spirit and scope of the present invention. The present application is based on Japanese patent application (JP 2007-047259) filed on Feb. 27, 2007 and Japanese patent application (JP 2007-109658) filed on Apr. 18, 2007, the entire contents of which are incorporated herein by reference.

The invention claimed is:

1. A conveyor bearing comprising:
an inner ring fitted on and fixed to a shaft;
a plurality of rolling elements disposed rollably on a raceway surface of the inner ring;
an outer ring disposed rotatably relative to the inner ring via the rolling elements; and
a seal member to seal in a grease between the outer ring and the inner ring,
wherein the conveyor bearing is configured such that the outer ring rotates during use,
the seal member comprises a first L-shaped annular member and a second L-shaped annular member, each of the L-shaped annular members having an L-shaped radial section, with a given interval therebetween to oppose each other in an axial direction of the conveyor bearing, and
the first L-shaped annular member comprising a first cylindrical portion fixed to an inner circumferential surface of an axially outer end portion of the outer ring and a first disc portion extending radially inwards from an axially inner end of the first cylindrical portion,
the second L-shaped annular member comprising a second cylindrical portion fixed to an outer circumferential surface of an axially outer end portion of the inner ring and a second disc portion extending radially outwards from an axially outer end of the second cylindrical portion at a location spaced outward from the first disc portion in the axial direction,
a seal lip is fitted to the first L-shaped annular member, the seal lip comprising:
a lip portion contacting the second disc portion of the second L-shaped annular member; and
a protruding portion provided on an outer circumferential side of the lip portion so as to form a gap between a distal end of the protruding portion and to be completely separated from the second disc portion of the second L-shaped annular member,
wherein the second L-shaped annular member is shaped so as to not extend in the axial direction over a top surface of the protruding portion.

2. The conveyor bearing according to claim 1, wherein the seal lip further comprises another lip portion contacting the second L-shaped annular member.

3. The conveyor bearing according to claim 1, wherein the protruding portion of the seal lip has a lip shape or a bumped shape.

4. The conveyor bearing according to claim 1, wherein an outside diameter of the second L-shaped annular member is set to be smaller than an outside diameter of the first L-shaped annular member.

5. The conveyor bearing according to claim 1, wherein the bearing is a multi-point contact ball bearing.

6. The conveyor bearing according to claim 1, wherein the gap between the distal end of the protruding portion and the second disc portion is in a range of 0.1 mm to 0.7 mm.

7. The conveyor bearing according to claim 1, wherein an outer circumferential surface of the protruding portion is inclined with respect to the axial direction such that the distal end of the protruding portion is directed radially outward.

* * * * *